(12) United States Patent
Wakatabe et al.

(10) Patent No.: US 8,895,192 B2
(45) Date of Patent: Nov. 25, 2014

(54) GRID PLATE FOR LEAD ACID STORAGE BATTERY, PLATE, AND LEAD ACID STORAGE BATTERY PROVIDED WITH SAME PLATE

(75) Inventors: Hiroyuki Wakatabe, Tokyo (JP); Katsura Mitani, Tokyo (JP); Shinichi Sano, Tokyo (JP); Yoshikazu Hirose, Tokyo (JP); Ichiro Shimoura, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 746 days.

(21) Appl. No.: 13/142,686

(22) PCT Filed: Dec. 21, 2009

(86) PCT No.: PCT/JP2009/007068
§ 371 (c)(1),
(2), (4) Date: Jun. 29, 2011

(87) PCT Pub. No.: WO2010/073588
PCT Pub. Date: Jul. 1, 2010

(65) Prior Publication Data
US 2011/0305957 A1    Dec. 15, 2011

(30) Foreign Application Priority Data

Dec. 22, 2008  (JP) .................................. 2008-325156
Sep. 28, 2009  (JP) .................................. 2009-222402

(51) Int. Cl.
*H01M 4/73* (2006.01)
*H01M 4/72* (2006.01)

(52) U.S. Cl.
CPC *H01M 4/73* (2013.01); *Y02E 60/12* (2013.01); *H01M 4/72* (2013.01)
USPC ................................................ 429/241; 29/2

(58) Field of Classification Search
CPC .................................. H01M 4/73; H01M 4/72
USPC .................................................. 429/241; 29/2
See application file for complete search history.

(56) References Cited

U.S. PATENT DOCUMENTS 2,625,574 A * 1/1953 Fuller ........................... 429/228

FOREIGN PATENT DOCUMENTS

| JP | 02-114451 | 4/1990 |
|---|---|---|
| JP | 04-162358 | 6/1992 |
| JP | 04-171666 | 6/1992 |
| JP | 07-235307 | 9/1995 |
| JP | 2001-273905 | 10/2001 |
| JP | 2001-332268 | 11/2001 |

* cited by examiner

*Primary Examiner* — Milton I Cano
*Assistant Examiner* — Brent Thomas
(74) *Attorney, Agent, or Firm* — Antonelli, Terry, Stout & Kraus, LLP.

(57) ABSTRACT

A grid plate for a lead acid storage battery including a frame section having a pair of quadrangular contour shape, and longitudinal and lateral grid strands forming a frame section grid. The longitudinal and lateral grid strands have thick strands of smaller thickness than the frame section, and thin strands of smaller width and thickness than the thick strands. Strands adjacent to the thick strands are thin strands, and space allows flow of active material to sides of the thick strands. Ends of the thick strands in the thickness direction are positioned further inward from end faces of the frame section in the thickness direction, and the end portions of one end side of the thin strands in the thickness direction are positioned offset to one end side of the thick strands in the thickness direction, and active material is packed into the reverse surface side of the grid plate.

13 Claims, 8 Drawing Sheets

GRID PLATE FOR LEAD ACID STORAGE BATTERY, PLATE, AND LEAD ACID STORAGE BATTERY PROVIDED WITH SAME PLATE

RELATED APPLICATIONS

The present application is a national stage entry of PCT/JP2009/007068, filed on Dec. 21, 2009, and claims foreign priority under 35 U.S.C. 119(a)-(d) or (f) to JP 2008-325156, filed on Dec. 22, 2008, and JP 2009-222402, filed on Sep. 28, 2009.

TECHNICAL FIELD OF THE INVENTION

The present invention relates to a grid plate for a lead acid storage battery, a plate, and a lead acid storage battery provided with the plate.

PRIOR ART OF THE INVENTION

Batteries can be roughly divided into primary batteries typified by manganese, mercury, alkaline, and the like; and chargeable secondary batteries typified by nickel-cadmium, lithium ion, nickel-hydrogen, and the like.

Currently, lithium ion batteries, nickel-hydrogen batteries, and other small, high-performance batteries are being developed as next-generation secondary batteries widely used in cellular telephones and the like. However, lithium ion batteries and nickel-hydrogen batteries are disadvantageous in terms of price, and in the particular case of lithium ion batteries, sufficient consideration must be given safety issues. Therefore, valve regulated lead acid storage batteries are widely used as batteries in backup power sources disposed in office buildings, hospitals, and the like in case of power outages, as industrial batteries for measures against instantaneous voltage drops, or as automotive batteries. Recently, power generation facilities that use solar cells, power generation facilities that use wind power generators, and other power generation facilities that use natural energy are actively being built; and the addition of storage batteries using secondary batteries in such power generation facilities is being considered in order to provide load-leveling of power. In such storage facilities, it is advantageous to use a lead acid storage battery as the battery because a large number of batteries are required.

FIG. 16 is an exploded view showing an example of the structure of a valve regulated lead acid storage battery. In the diagram, reference numerals 1 and 2 are a positive plate and a negative plate, respectively, and a plate group 4 is composed of positive plates 1 and negative plates 2 that are layered in alternating fashion with interjacently disposed separators 3.

In FIG. 16, the positive plates 1, 1, ..., the negative plates 2, 2, ..., and separators 3, 3, ... are offset in position in order to facilitate understanding of the structure, but in the positive plate 1 and the negative plate 2 are actually layered in alternating fashion with interjacently disposed separators 3 in accordance with the positions of the positive plates and the negative plate.

Reference numeral 5 is a positive strap for connecting the end portions provided to a plurality of a positive plates 1, 1, ...; reference numeral 6 is a negative strap for connecting the end portions provided to a plurality of negative plates 2, 2, ...; and a positive pole 5a and a negative pole 6a are provided to the positive strap 5 and the negative strap 6, respectively.

The plate group 4 is accommodated together with an electrolyte in a cell chamber 7a of a container 7. The opening at the upper end of the container 7 is closed off by a lid 8, and the positive pole 5a and negative pole 6a are drawn out to the exterior via holes provided in a positive pole terminal bushing 9 and a negative pole terminal bushing 10, respectively, formed by casting in the lid 8. A vent plug 11 is mounted on the lid 8 and the vent plug opens and releases pressure inside the container when the pressure inside the container has exceeded a specified value.

Since the example shown in FIG. 16 is a single cell, only one cell chamber is provided to the container 7, and in the case that the rated voltage of the battery greater than 2 V, a plurality of cell chambers is arranged in the container 7, a plate group is inserted into each cell chamber, and the spaces between straps, which have predetermined polarity, of the plate groups inserted into adjacent cell chambers are mutually connected via inter-cell connection parts provided through the partition walls, whereby the cells constituted in each of the plurality of cells are connected in parallel or in series to constitute a lead acid storage battery having a predetermined rated voltage and rated capacity.

There are known plates for a lead acid storage battery having a tubular-type, pasted-type, or Tudor-type structure, or a variety of other types. Among the above, pasted plates, which are capable of high-current discharge, are widely used.

A pasted positive plate and negative plate have a structure in which positive active material and negative active material are packed into and held by grid plate constituting collectors. The grid plate constituting the collector may be manufactured by casting or by expanding a lead or lead alloysheet, but in the present invention, the grid plate is manufactured by casting.

A grid plate manufactured by casting has a substantially quadrangular (rectangular or square) profile shape as described in, e.g., Japanese Laid-open Patent Application No. 2001-332268, and is composed of a frame section having a pair of lateral frame strands that extend in the lateral direction and that are in an opposing arrangement in the longitudinal direction, and a pair of longitudinal frame strands that extend in the longitudinal direction and that are in an opposing arrangement in the lateral direction; a plurality of lateral grid strands and a plurality of longitudinal grid strands that form a grid inside the frame section; and a plate lug section integrally formed in one lateral frame strand of the frame section.

In the example shown in FIG. 16, the grid plate constituting the collectors of the positive plate 1 and the negative plate 2 are indicated by the reference numeral 20. The grid plates 20 in the diagram have a rectangular profile shape, and are composed of a frame section 21 having a pair lateral frame strands 21a, 21a that extend in the lateral direction and that are in an opposing arrangement in the longitudinal direction, and a pair of longitudinal frame strands 21b, 21b that extend in the longitudinal direction and that are in an opposing arrangement in the lateral direction; a plurality of lateral grid strands 23 and a plurality of longitudinal grid strands 24 that form a grid 22 inside the frame section; a plate lug section 25 integrally formed in one lateral frame strand 21a of the frame section 21; and leg sections 26 integrally formed in the other lateral frame strand 21a.

In the present specification, the portion of the grid plate on which the plate lug section is provided is the upper section of the grid plate, and the direction in which the longitudinal frame strand 21b extends (the lengthwise direction of the longitudinal frame strand) is the longitudinal direction of the grid plate. The direction in which the lateral frame strand 21a extends is the lateral direction of the grid plate, and the direction perpendicular to the longitudinal and lateral directions of the grid plate is the thickness direction of the grid plate. The longitudinal, lateral, and thickness directions of the plate are directions along the longitudinal, lateral, and thickness directions, respectively, of the grid plate. In relation to the frame strands and grid plate strands, the direction along the thickness direction of the grid plate is the thickness direction, and the direction perpendicular to the lengthwise direction and the thickness directions is the width direction.

When a plate for a lead acid storage battery is manufactured using this type of grid plate, the grid plate is placed on a conveyor belt or other conveyance means to convey the grid plate in a state in which the thickness direction of a cast grid plate 20 is oriented in the longitudinal direction, and in the conveyance process the active material in the form of a paste is fed to the grid plate 20 from a paste packing machine disposed above, the active material is packed into the grid plate, the packed active material is pressed from one end side (upper end side) in the thickness direction of the grid plate to the other end side (lower end side) to cause the active material to flow through the grid openings and thereby fill the entire grid with paste.

FIG. 16 shows a state in which each section of the grid plate 20 can be viewed, but when the active material is packed into the grid plate 20, at least the lateral grid strands 23 and the longitudinal grid strands 24 of the grid plate 20 are embedded in the active material.

When the components of the lead acid storage battery degrade with use over time, the lead acid storage battery eventually reaches the end of its service life. A main cause that brings a lead acid storage battery to the end of its service life is corrosion (generation of $PbO_2$ by oxidation) of the grid plate (mainly the grid plate of the positive plate). $PbO_2$ has electroconductivity, on the other hand the mass of it is fragile. Therefore, the grid strands 23 (or 24) break when corrosion of the grid strands of the positive plate progresses, the grid strands lose their shape, the function for holding the active material 27 is lost, and eventually the battery reaches the end of its service life.

FIG. 12 is a cross-sectional view showing a cross section of the active material 27 and the lateral grid strands 23 or the longitudinal grid strands 24 of a plate that uses a conventional grid plate along the surface perpendicular to the axial line of the grid strands. The grid strands 23 (or 24) in the diagram have a hexagonal cross-sectional shape that is thin in the thickness direction (the longitudinal direction in FIG. 12) of the plate. The distance between individual grid strands must be kept small to a certain degree in order to increase the collection characteristics of the grid and increase the activity of the electrochemical reaction of the active material in each section of the plate. However, when the distance between individual grid strands is excessively narrow, the active material has difficulty flowing through the gaps between the grid strands when the paste-form active material is packed into the grid plate, the grid strands overall can no longer be embedded in the active material, and portions of the grid strands are liable to remain exposed. When the number of grid strands is excessively high, the quantity of active material required to obtain a predetermined battery capacity can no longer be packed into the grid plate.

In the conventional grid plate shown in FIG. 12, the width w of the grid strands and the distance d between grid strands is set so as to provide a gap required for the unobstructed flow of paste-form active material 27 between adjacent grid strands having the same thickness, to allow the grid strands to be arranged with the density required to achieve a predetermined collection performance, and to allow a predetermined amount of the active material to be held in the grid plate. The cross-sectional area of the grid strands is set in accordance with the desired longevity of the battery.

In the case that all of the grid strands have the same thickness, as shown in FIG. 12, the mechanical strength of the grid overall is reduced, the grid strands break, and original shape of the strands inside the frame section can no longer be maintained, whereupon the active material falls away when corrosion of the grid strands advances and the end of service life approaches. Therefore, the expected service life period may be unachievable.

In view of the above, it is possible to consider the use of thick strands with a large cross-sectional area as the grid strands 23 (or 24) of the grid plate, as shown in FIG. 13, in order to extend the length of time that the grid strands can endure corrosion and to obtain longer service life in a lead acid storage battery (e.g., see Japanese Laid-open Patent Application No. 2001-332268).

A grid plate has also been proposed in which the grid strands are composed of thick and thin strands in an attempt to impart mechanical strength using thick strand portions, as described in Japanese Laid-open Patent Application No. 4-171666.

The need for longer service life in lead acid storage battery has increased in recent years. In particular, in storage equipment provided as accessory equipment to power generation equipment that uses natural energy, it is desirable that the service life of a lead acid storage battery be the same length (e.g., 17 years or more) as the service life of a wind power generation apparatus, a solar cell, or other power generation means. In view of such a goal, it is possible to consider increasing the thickness of the grid strands 23, 24 of the grid plate to a sufficient degree that allows sufficient mechanical strength to be obtained in order to withstand corrosion and maintain the function for holding the active material until the usage life cycle reaches the service life cycle, as shown in FIG. 13.

However, the distance d between grid strands is dramatically reduced when all of the grid strands are made thick enough to withstand corrosion over a long period of time such as 17 years. Therefore, it becomes difficult to cause the active material to smoothly flow between grid strands when the active material paste is packed into the grid plate from above in a state in which the thickness direction of the grid plate is oriented in the longitudinal direction. Accordingly, it is difficult for the active material to move downward and around the end face of the grid strands 23, 24 that are facing downward when the active material is packed in to the grid plate in the case that the cross-sectional area of all the grid strands has been made large; and portions exposed from the active material 27 appear on the grid strands 23 and (or) 24, resulting in a state in which the grid strands can be visually observed, as shown in FIG. 13.

When a plate that is incompletely packed with active material is so used in a battery without further modification, the grid strands and sulfuric acid as the electrolyte come into direct contact and a passive lead sulfate film is formed on the surface of the grid strands. This passive film does not return to its original state even when charged. The passive film is formed on the entire peripheral surface of the grid strands when a surface of the grid strands is exposed from the active material because electrolyte penetrates the boundary between the grid strands and the active material. Conductivity between the grid strands and the active material is obstructed when a passive film is formed on the entire periphery of the grid strands. Therefore, charging is no longer possible, which leads to premature capacity loss (PCL) of the battery and the loss of ability to respond to demand when the service life of the battery is prolonged.

When all of the grid strands are made thick, the amount of active material that can be packed into a grid plate is reduced and therefore leads to reduced battery capacity.

It is possible to consider arranging the thick strands with a greater distance d between strands, but when the distance between grid strands is excessive, the collection characteristics of the grid strands are reduced, the flow of electrons between the grid strands and the active material is insufficient, the charging and discharging reactions of the active material are less likely to occur, and the charge and discharge characteristics of the battery are unavoidably reduced.

The thick strand portion can be provided with mechanical strength when the grid strands are composed of thick strands and thin strands, as described in Japanese Laid-open Patent Application No. 4-171666. However, with a conventional grid plate in which the grid strands are composed of thick strands and thin strands, the two ends of the thick strands in the thickness direction are unavoidably exposed without being covered by active material when the active material is packed into the grid plate. This is because the thickness of the thick strands (the dimension measured in the thickness direction of the plate) is the same as that of the frame section. When a positive plate is used in a state in which the two ends of the thick strands of the grid plate in the thickness direction are so exposed, not only do the exposed end portions of the thick strands make direct contact with the electrolyte, but also the electrolyte penetrates through the boundary between the thick strands and the active material and forms a passive film on the entire periphery off the thick strands. Therefore, premature capacity loss in the battery is unavoidable.

SUMMARY OF THE INVENTION

An object of the present invention is to provide a grid plate for a lead acid storage battery that can not only withstand long-term corrosion of the grid and provide a function for holding active material, but can also prevent premature loss of capacity due to the formation of a passive film on the surface of the grid strands in which a portion of the grid strands are exposed through the active material, and extend the service life of the lead acid storage battery.

Another object of the present invention is to provide a plate for a lead acid storage battery that uses the grid plate described above.

Yet another object of the present invention is to provide a lead acid storage battery in which service life can be extended using the plate described above.

In the present invention, at least first to thirteenth aspects described hereinbelow are disclosed in order to achieve the objects described above.

The invention according to a first aspect is a grid plate for a lead acid storage battery comprising a frame section having a pair of lateral frame strands that extend in a lateral direction and oppose one another in a longitudinal direction, and a pair of longitudinal frame strands that extend in the longitudinal direction and oppose one another in the lateral direction; a plurality of lateral grid strands and a plurality of longitudinal grid strands that are provided so as to extend parallel to the lateral frame strands and the longitudinal frame strands, respectively, so that a grid is formed inside the frame section; and a plate lug section integrally formed in one lateral frame strand of the frame section.

In the present invention, at least the longitudinal grid strands or the lateral grid strands have a plurality of thin strands that have a cross-sectional area that can withstand corrosion for a predetermined service life period of the lead acid storage battery, and a plurality of thick strands that have a greater cross-sectional area than that of the thin strands, the thick strands and thin strands being arranged so that the strands adjacent to the thick strands are thin strands. The plurality of thick strands have a thickness that is less than the thickness of the frame section, an end portion of one end side and an end portion of the other end side of the thick strands with respect to the thickness direction are positioned further inward in the thickness direction than the end face of the one end side and the end face of the other end side, respectively, in the thickness direction of the frame section; and are arranged in a state in which the respective end portions of one end side in the thickness direction are positioned in the same plane. The width and thickness of the thin strands are set to be less than the width and thickness of the thick strands. The plurality of thin strands are provided in a state in which the respective end portions on one end side in the thickness direction are positioned in positions closer to the plane in which the end portions of one end side of the plurality of thick strands in the thickness direction are arranged, but so as not to cross over the plane in which the end portions of one end side of the plurality of thick strands in the thickness direction are arranged.

As described above, a thick strand portion that can withstand corrosion for a longer period of time can be given mechanical strength and the grid shape can be maintained even in the case that the mechanical strength of the thin strand portion has decreased due to corrosion when at least one among the longitudinal grid strands and the lateral grid strands are composed of thick strands and thin strands. Therefore, the function for holding the active material in the grid can be maintained over a longer period of time in comparison with the case in which all of the grid strands are formed from thin strands.

As described above, a wide space for allowing paste-form active material to flow to the sides of the thick strands can be provided when thick strands and thin strands are arrayed so that the grid strands adjacent to the thick strands are thin strands. Therefore, when active material is packed from one surface side of the grid plate, the active material can be allowed to smoothly flow to the other surface side of the grid plate.

Furthermore, as described above, space for allowing active material to flow below the thick strands can be formed when the active material is packed into the grid plate by disposing the end portions of one end side and the end portions of the other end side of the plurality of thick strands in the thickness direction in positions further inside of the end faces of the one end side and the end faces of the other end side in the thickness direction of the frame section. Therefore, the end faces of the thick strands facing downward when the active material is to be packed can be prevented from exposure without being covered with the active material. Also, as described above, wide space can be provided below the thin strands and the active material that has flowed below the thin strands can readily flow below the thick strands when the active material is packed into the grid plate. This is achieved by disposing the end portions of one end side of the plurality of thin strands in the thickness direction in positions closer to the plane in which the end faces of the one end side of the thick strands in the thickness direction are arranged. Therefore, the thick and thin strands can be reliably embedded in the active material, and the possibility that a portion of the grid strands will be exposed can be eliminated. In particular, when the active material is packed into the grid plate, the grid strands can be even more reliably embedded in the active material when the active material is packed to the thickness of the frame strands or greater. It is therefore possible to prevent a lead sulfate film, which is a passive film, from being formed on the surface of the grid strands and to prevent a premature loss of capacity.

As described above, in accordance with the present invention, thick strands with a greater cross-sectional area than the thin strands are provided in addition to thin strands having a cross-sectional area that can withstand corrosion for a desired service length of time. Therefore, the shape of the grid plate and the function for holding the active material can be maintained over a long period of time, and it is possible to prevent a portion of the grid strands from being exposed from the active material and thereby prevent the formation of a passive film on the surface of the grid strands. Accordingly, the service life of the lead acid storage battery can be considerably extended beyond that of a conventional lead acid storage battery because the plate (the positive plate in particular) for a lead acid storage battery can be formed using the grid body of the present invention.

The invention according to a second aspect is one applied to the invention according to the first aspect, wherein the longitudinal grid strands have thick longitudinal strands that are the thick strands and thin longitudinal strands that are the thin strands; and the lateral grid strands have thick lateral strands that are the thick strands and thin lateral strands that are the thin strands.

As described above, the number of grid strands that can withstand long-term corrosion can be increased and the function for holding the active material can be maintained over a long period of time when the longitudinal grid strands are composed of thick longitudinal strands and thin longitudinal strands and the lateral grid strands are composed of thick lateral strands and thin lateral strands. Also, the end faces of the thick longitudinal strands and the thick lateral strands that are facing downward when the active material is packed can be reliably covered, and it is possible to prevent a state in which a portion of the grid strands is exposed from the active material, because the flow of paste-form active material during packing can be facilitated due to the presence of thin longitudinal strands and thin lateral strands. Therefore, the service life of a lead acid storage battery can be extended by using the grid plate according to the present invention as at least the positive plate of a lead acid storage battery.

The invention according to a third aspect is one applied to the invention according to the first aspect, wherein the plurality of thin longitudinal strands and the plurality of thin lateral strands are provided in a state in which the respective end portions of one end side in the thickness direction are positioned in the same plane as the plane in which the end portions of one end side of the thick longitudinal strands and the thick lateral strands in the thickness direction are arranged.

The invention according to a fourth aspect is one applied to the invention according to the second aspect, wherein a ratio of the number of thin lateral strands to the number of thick lateral strands provided per fixed unit area in a region adjacent to one lateral frame strand provided with the plate lug section is greater than a ratio of the number of thin lateral strands to the number of thick lateral strands provided per fixed unit area in a region near another lateral frame strand in a position set apart from the plate lug section. In other words, the interval in which the thick lateral strands are arranged in the region near the other lateral frame strand is narrowed.

The invention according to a fifth aspect is one applied to the invention according to the second aspect, wherein the thick longitudinal strands and the thin longitudinal strands constituting the longitudinal grid strands are disposed so that the thick longitudinal strands and the thin longitudinal strands are aligned in alternating fashion in a lengthwise direction of the lateral frame strands. Also, in the present invention, a first region and a second region are established, respectively, on one lateral frame strand side on which the plate lug section is disposed and on another lateral frame strand side in a position set apart from the plate lug section; and the number of thin lateral strands in the first and second regions is set so that the number of thin lateral strands arranged between the mutually adjacent thick lateral strands in the first region is greater than the number of thin lateral strands arranged between the mutually adjacent thick lateral strands in the second region, where the one of the lateral frame strands and the other of the lateral frame strands are regarded as thick lateral strands. Specifically, in the second region, the interval at which the thick lateral strands are arranged is narrowed.

The invention according to a sixth aspect is one applied to the invention according to the fifth aspect, wherein the number of thin lateral strands arranged between mutually adjacent thick lateral strands in the first region is 4, and the number of thin lateral strands arranged between mutually adjacent thick lateral strands in the second region is 3.

As described in the fourth to sixth aspects, the average value of the electrical resistance of the grid strands can be reduced in accordance with the distance from the plate lug section when the ratio of the number of thin lateral strands to the number of thick lateral strands in the region near the plate lug section is increased, and the thick lateral strands and the thin lateral strands constituting the lateral grid strands are provided so that the ratio of the number of thin lateral strands to the number of thick lateral strands is reduced in the region set at a distance from the plate lug section. Therefore, collection resistance can be reduced, and a considerable drop in voltage can be prevented in the portions of the grid strands that are set at a distance from the plate lug section.

When, as described above, the thick lateral strands and thin lateral strands are provided so that the number of thin lateral strands disposed between the thick lateral strands is increased in the first region near the plate lug section and the number of thin lateral strands provided between the thick lateral strands is reduced in the second region set at a distance from the plate lug section, then if the thick longitudinal strands and the thin longitudinal strands are provided so that the thick longitudinal strands and the thin longitudinal strands are aligned in alternating fashion in the lengthwise direction of the lateral frame, there can be more space from the sides of the thick longitudinal strands. Therefore, the flow of active material when the active material is to be packed is facilitated, the active material can be smoothly packed below the grid strands, and it is possible to reliably prevent the occurrence of a state in which some of the grid strands are exposed without being covered by the active material.

In particular, and in accordance with the sixth aspect, when the thick lateral strands and the thin lateral strands are provided so that four thin lateral strands are aligned between the mutually adjacent thick lateral strands in the first region near the plate lug section, and so that three thin lateral strands are aligned between the mutually adjacent thick lateral strands in the second region set at a distance from the plate lug section, the collection resistance in the region set at a distance from the plate lug section can be reduced, and it is possible to prevent a greater drop in voltage in the portions of the grid strands set at a distance from the plate lug section. Additionally, the active material is less complicated to pack, and it has been confirmed by experimentation that the effect of preventing a state in which a portion of the grid strands is exposed can be particularly enhanced.

The invention according to a seventh aspect is one applied to the invention according to the second aspect, wherein the value obtained by dividing the width of the thick longitudinal strands by the width of the thin longitudinal strands, the value obtained by dividing the thickness of the thick longitudinal strands by the thickness of the thin longitudinal strands, the value obtained by dividing the width of the thick lateral strands by the width of the thin lateral strands, and the value obtained by dividing the thickness of the thick lateral strands by the thickness of the thin lateral strands, are in a range of 1.1 to 1.5.

As a result of experiments carried out by the present inventor, it was confirmed that the width and thickness of the thick strands and the width and thickness of the thin strands can be set to a suitable size when the relationship between the thickness of the thick strands and the thickness of the thin strands is set in the manner described above; that the flow of active material can be smoothed when the active material is to be packed and all of the grid strands can be reliably embedded in the active material; and that the service life of a plate can be extended because the active material can be reliably held in the grid plate.

The invention according to an eighth aspect is one applied to the invention according to the first aspect, wherein the lateral grid strands have thick lateral strands that are the thick strands, and thin lateral strands that are the thin strands, but the longitudinal grid strands have only thick longitudinal strands that are the thick strands.

When only the lateral grid strands are composed of thick strands and thin strands, the space formed by the thick strands to the sides can thus be made larger than when all of the grid strands are composed of thick strands. Therefore, the flow of active material can be facilitated, the packing of the active material into the grid plate can be smoothly carried out, and there is a lower possibility that a plate will be manufactured with a portion of the grid strands exposed. In this case, the number of thick longitudinal strands that can withstand long-term corrosion can be made larger than when the longitudinal grid strands are composed of thick longitudinal strands and thin longitudinal strands. Therefore, the shape of the grid can be maintained over a long period of time and the function for holding the active material in the grid can be maintained over a long period of time.

The invention according to a ninth aspect is one applied to the invention according to the eighth aspect, wherein the plurality of thin lateral strands are provided in a state in which the end portions of one end side thereof in the thickness direction are positioned in the same plane as the plane in which the end portions of the one end side in the thickness direction of the thick longitudinal strands and the thick lateral strands are arranged.

The invention according to a tenth aspect is one applied to the invention according to the eighth aspect, wherein a ratio of the number of thin lateral strands to the number of thick lateral strands provided per fixed unit area in a region adjacent to one lateral frame strand (on which the plate lug section is disposed) is greater than a ratio of the number of thin lateral strands to the number of thick lateral strands provided per fixed unit area in a region near another lateral frame strand in a position set apart from the plate lug section. In other words, the interval in which the thick lateral strands are arranged in the region near the other lateral frame strand is narrowed.

The invention according to an eleventh aspect is one applied to the invention according to the eighth aspect, in which a first region and a second region are set near one lateral frame strand on which the plate lug section is disposed and near another lateral frame strand set apart from the plate lug section, respectively; and a ratio of the number of thin lateral strands to the number of thick lateral strands in the first region is set as a first ratio, and a ratio of the number of thin lateral strands to the number of thick lateral strands is set as a second ratio which is less than the first ratio. In other words, in the second region, the interval in which the thick lateral strands are arranged is narrowed.

When configured in this manner, as with the fourth aspect, the average value of the electrical resistance of the grid strands can be reduced in accordance with the distance from the plate lug section. Therefore, collection resistance can be reduced, and a considerable drop in voltage can be prevented in the portions of the grid strands that are set at a distance from the plate lug section.

A twelfth aspect relates to a plate for a lead acid storage battery in which the grid plate according to the present invention is used, and in the present invention the plate for a lead acid storage battery is formed by packing an active material into the grid plate according to any of the first to eleventh aspects.

A thirteenth aspect relates to a lead acid storage battery in which the grid plate according to the present invention is used, and in the present invention at least a positive plate has a configuration in which positive active material is packed into the grid plate according to any of the first to eleventh aspects. The negative plate may also have a configuration in which negative active material is packed into the grid plate according to any of the first to eleventh aspects, but the configuration of the negative plate is not limited to the case in which the grid plate according to any of the first to eleventh aspects is used.

In accordance with the present invention, at least the longitudinal grid strands or the lateral grid strands are composed of thick strands and thin strands. Therefore, mechanical strength can be imparted to the thick-strand portions that withstand corrosion of a greater length of time, the shape of the grid can be maintained, and the function of holding the active material in the grid can be maintained over a longer period of time in comparison with the case in which all of the grid strands have been formed using thin strands, even when corrosion of the thin strand portions has progressed and the mechanical strength has been reduced.

Also, in accordance with the present invention, thick strands and thin strands are arrayed so that the grid strands adjacent to the thick strands are thin strands. Therefore, considerable space can be ensured in order to allow active material paste to flow to the sides of the thick strands, and when the active material is packed from one surface side of the grid plate, the active material can be made to smoothly flow to the other surface side of the grid plate.

In particular, in accordance with the present invention, the end portion of one end side and the end portion of the other end side in the thickness direction of the plurality of thick strands are positioned further inward in the thickness direction than the end face of the one end side and the end face of the other end side, respectively, in the thickness direction of the frame section. Therefore, the two ends of the thick strands in the thickness direction can be embedded in the active material when the active material is packed into the grid plate. Also, in the present invention, the plurality of thin strands are arranged in a state in which the respective end portions of one end side in the thickness direction are positioned in positions closer to the plane in which the end portions of one end side of the plurality of thick strands in the thickness direction are arranged. Therefore, considerable space can be obtained below the thin strands when the active material is to be packed into the grid plate, and the active material that has flowed below the thin strands can readily flow below the thick strands. Therefore, in accordance with the present invention, the thick strands and the thin strands can be reliably embedded in the active material, and it is possible to eliminate the possibility of a situation in which a portion of the grid strands is exposed.

As described above, in accordance with the present invention, the grid is composed of thin strands and thick strands to increase the mechanical strength of the grid, and a structure is used in which the thin strands and the thick strands are reliably embedded in the active material. Therefore, it is possible to provide resistance to corrosion over a long period of time and the function for holding the active material in the grid can be maintained. The end portions of one end side of the thin strands in the thickness direction are positioned in positions closer to the plane in which end portions of one end side of the thick strands in the thickness direction have been arranged, whereby the active material more readily flows to the end portion side in the thickness direction of the thick strands, which have been placed facing downward when the active material is to be packed. Therefore, a state in which a portion of the grid strands is exposed can be reliably prevented when the active material is packed, and plates in which all of the grid strands have been completely covered with active material can be manufactured with good yield. The service life of a battery can be considerably extended beyond that of conventional examples by forming a plate (the positive plate in particular) for a lead acid storage battery using the grid body according to the present invention, and it is also possible to achieve a long-life lead acid storage battery having about the same service life as the service life of a wind power generation apparatus, a solar power generation apparatus, or other power generation means that uses natural energy, which has been impossible to achieve using conventional techniques.

DETAILED DESCRIPTION OF THE PREFERRED EMBODIMENTS

Figure 1:
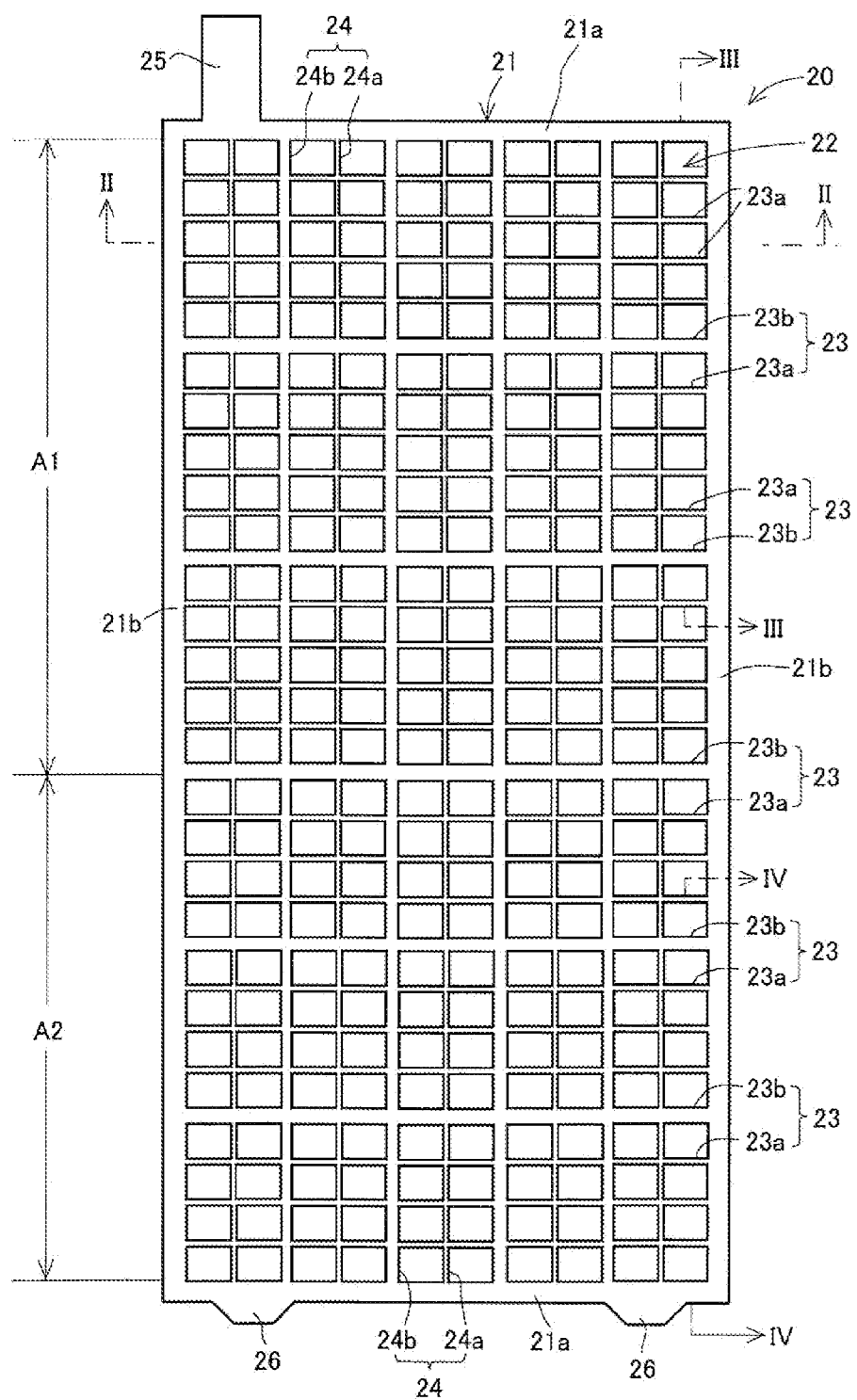
FIG. 1 is a cross-sectional view of a grid plate for a lead acid storage battery according to an example of the present invention.

Prior to a description of specific configuration examples of the grid plate for a lead acid storage battery according to the present invention, basic points will be described in relation to the grid plate for a lead acid storage battery according to the present invention, a plate that uses the grid plate, and a lead acid storage battery using the plate.

[Grid Plate Material]

The grid plate according to the present invention may be formed from an alloy containing lead as the main material to which tin, calcium, antimony, sodium, or other alloy material has been added. It is particularly preferred that tin and calcium be added as alloy material to the main material. The ratio of self-discharge can be reduced when calcium is added. When calcium is added to the main material (lead), there is a problem in that the grid strands readily corrode, but grid strand corrosion can be reduced by adding tin.

The grid plate is composed of a frame section, a grid disposed inside the frame section, and a plate lug section provided to the frame section. The frame section is composed of a pair of lateral frame strands in an opposing arrangement in the longitudinal direction, a pair of longitudinal frame strands in an opposing arrangement in the lateral direction, and a plate lug section provided to one of the lateral frame strands. The grid disposed inside the frame section is composed of lateral grid strands that extend parallel to the lateral frame strands, and longitudinal grid strands that extend parallel to the longitudinal frame strands.

[Frame Section]

The frame section composed of the lateral grid strands and the longitudinal grid strands forms the external shape of the grid plate. The shape of the frame section is not limited to a particular shape; the shape is preferably one that matches the internal shape of the container (the outer case) of the lead acid storage battery that is ultimately used. In the case that a container having the shape of a cuboid or rectangular parallelepiped is used, the profile shape of the frame section can be a square shape or a rectangular shape.

In the case that the profile shape of the frame section is rectangular, the long-side dimension can be set to 370 to 390 mm, and the short-side dimension to 130 to 150 mm. A large plate can be fabricated when such dimensions are used, and a lead acid storage battery having a large discharge capacity can be fabricated by using a large number of these plates. The dimensions described above are about the same dimensions as the plate of a multipurpose industrial lead acid storage battery; and it is possible to use a widely used container for accommodating the plate composed of the grid body having the above-noted dimensions, and a lid for closing off the container, without modification.

The cross-sectional shape of the lateral frame strands and the longitudinal frame strands is not particularly limited, but a preferred shape is one in which the contact surface area with the active material is high and the active material is readily packed. The cross-sectional shape of the lateral frame strands and the longitudinal frame strands can more specifically be a shape that is rhombic or hexagonal in cross section and long in the thickness direction of the grid plate.

The thickness of the lateral frame strands and the longitudinal frame strands is not particularly limited, but 5 mm or more is preferred. In the present invention, it is important that the thickness of the inner strands (grid strands) constituting the grid inside the frame section be less than the thickness of the frame strands. If the thickness of the lateral frame strands and the longitudinal frame strands is standardized at 5 mm or more, design is facilitated for increasing the thickness of the inner strands in order to enable the grid plate to withstand corrosion over a long period of time, and for narrowing the inner stands in order to ensure that a portion of the grid is not exposed when the active material is to be packed into the grid.

[Plate Lug Section]

A plate lug section for collection is provided to the frame section of the grid plate. The plate lug section is used for connecting a strap that connects the plates of a plate group of the same polarity. The shape, number, thickness, material, and other attributes of the plate lug section are not particularly limited, but the plate lug section is preferably formed to a suitable shape and size in accordance with the shape of the container and the lid, and the shape of the plate. The number of plate lug sections is preferably one, and the thickness is preferably about the same thickness as that of the frame section. The plate lug section is preferably formed from the same materials as the frame and grid sections in order to facilitate manufacture.

[Longitudinal Grid Strands and Lateral Grid Strands]

The longitudinal grid strands and lateral grid strands are required for maintaining the external shape of the frame section, holding the active material, and causing the active material to carry out charge and discharge reactions. The number of longitudinal grid strands and lateral grid strands is not particularly limited, but an excessive number of strands causes the gap between grid strands to become excessively narrow when the active material is packed and the active material has difficulty moving around to the reverse side of the downward-facing grid during active material packing. When there are too few grid strands, not only is it more difficult to hold the packed active material, but it is also no longer possible to cause the active material to actively carry out charge and discharge reactions. Accordingly, the number of longitudinal grid strands and lateral grid strands is preferably set to a suitable number that facilitates packing of the active material, allows the active material to be reliably held in place, does not cause obstruction to the charge and discharge reactions of the active material, and allows the required amount of active material to be obtained for the discharge capacity of the lead acid storage battery to be used.

The cross-sectional shape of the longitudinal grid strands and lateral grid strands is not particularly limited, but it is preferred that the shape be one in which the contact surface area with the active material is high, the active material can be reliably held in place, and the active material can be readily packed into the grid. Specifically, the cross-sectional shape of the longitudinal grid strands and lateral grid strands may be a rhombus or hexagon that is long in the thickness direction (thickness direction of the plate) of the grid plate.

The material of the longitudinal grid strands and lateral grid strands may be the same as or different from that of the lateral frame section and longitudinal frame section described above, but the material constituting the longitudinal grid strands and lateral grid strands is preferably the same material constituting the lateral frame section and longitudinal frame section so that the lateral frame section, longitudinal frame section, lateral grid strands, and longitudinal grid strands can be integrally formed in a simple single process.

The plurality of longitudinal grid strands and (or) lateral grid strands used in the present invention do not all have the same thickness, but rather have thin strands having a cross-sectional area provided with a certain amount of tolerance so as to be capable of withstanding corrosion for a desired service life period, and thick strands having a greater cross-sectional area than the thin strands. The thick strands and thin strands are arrayed so that the strands adjacent to the thick strands are without exception thin strands. The cross-sectional area of the thin strands can be determined based on empirical data. The cross-sectional area of the thick strands is set to an area required for imparting necessary strength to the thick strands in order to keep the shape of the grid as the original shape even when corrosion of the grid strands has progressed to nearly the established service life period and the mechanical strength of the thin strands has declined. The cross-sectional area of the thick strands can also be determined based on empirical data.

The plurality of thick strands provided to at least one among the lateral grid strands and the longitudinal grid strands are formed so as to have a thickness that is less than the thickness of the frame section, and are arranged so that the end portions of one end side in the thickness direction and the end portions of the other end side in the thickness direction are positioned further inside in the thickness direction than the end faces of one end side and the end faces of the other end side in the thickness direction of the frame section, and so that the end portions of the one end side in the thickness direction are positioned in the same plane.

The thin strands provided to at least one among the lateral grid strands and the longitudinal grid strands are configured so as to be less wide than the thick strands and less thick than the thick strands, and at least one among the longitudinal grid strands and the lateral grid strands are configured so that a thin strand is invariably arranged next to a thick strand so that the thick strands are never arranged in sequence. The plurality of thin strands is provided in a state in which the end portions of one end side in the thickness direction are arranged in positions closer to the plane in which the end portions of the one end side in the thickness direction of the plurality of thick strands are arranged. In such a configuration, the shape on the reverse side (other end side in the thickness direction) of the grid plate which is facing downward when the active material is packed into the grid body is a shape in which the thick strands protrude downward and the thin strands are in a concave state. Since an expansive space can be formed below the thin strands, the active material can readily flow below the thick strands and it is possible to prevent a portion of the grid from remaining uncovered by active material.

In a preferred mode of the present invention, the end portions of one end side of the plurality of thin strands in the thickness direction are provided so as to be positioned in the same plane as the plane in which the end portions of one end side of the plurality of thick strands in the thickness direction are positioned.

In the present invention, it is very important that the two ends of the thick strands in the thickness direction be positioned and arranged further inside the two ends of the frame section in the thickness direction. In the case that the thick strands are provided so that the thickness of the thick strands is the same as the thickness of the frame section, one end of the thick strands in the thickness direction is positioned in the same plane as one end of the frame section in the thickness direction, and the other end of the thick strands in the thickness direction is positioned in the same plane as the other end of the frame section in the thickness direction, it is impossible to avoid a state in which the end portions of the thick strands in the thickness direction are exposed when the active material is packed into the grid plate. The end portions of the thick strands which are facing upward when the active material is packed into the grid plate can be embedded in the active material by feeding an excessive amount active material, but it is difficult to apply the active material to cover the end portions of the thick strands which are facing downward when the active material is packed into the grid plate. When the lead acid storage battery is formed using a positive plate with the end portions of the thick strands uncovered and exposed, a passive film (lead sulfate) is formed on the surface of the thick strands because not only are the end portions of the exposed thick strands in direct contact with the electrolyte, but the electrolyte also penetrates the boundary between the thick strands and the active material, and the electrolyte comes into direct contact with the surface of the thick strands. The formation of a passive film on the surface of the thick strands leads to premature loss of capacity and the service life of the battery is shortened because current no longer flows between the thick strands and the active material, and charge and discharge reactions of the active material can no longer occur in the thick strand portions. In contrast, as described in the present invention, the thickness of the thick strands is made less than the thickness of the frame section, the two ends of the thin strands in the thickness direction, and also the two ends of the thick strands in the thickness direction are positioned further inside the two ends of the frame section in the thickness direction. Therefore, it is possible to prevent electrolyte from making direct contact with grid strands and a passive film from being formed on the surface of the grid strands because the thick strands and thin strands can be completely covered with active material in the case that the lead acid storage battery is formed using a plate obtained by packing active material into a grid body; and it is possible to prevent premature loss of battery capacity and to extend battery service life.

In the present invention, the thick strands and thin strands are arrayed so that the strands adjacent to the thick strands are thin strands, the size (width and thickness) of the thin strands constituting the lateral grid strands and longitudinal grid strands is not necessarily required to be a single size, and it is also possible to provide a plurality of types of thin strands that differ in width and thickness. The thin strands arranged between the frame section and the thick strands and between thick strands and thick strands may be a single strand or a plurality of strands.

The configuration may be one in which only one among the longitudinal grid strands and lateral grid strands are provided with thick strands and thin strands, and the other are composed of strands all having the same size, but it is preferred that both the longitudinal grid strands and the lateral grid strands be composed thick strands and thin strands in order to achieve the objects of the present invention, i.e., to improve the corrosion resistance of the grid strands and to prevent a state in which a portion of the grid strands remains uncovered by the active material.

The cross-sectional shape of the thick strands and thin strands constituting the lateral grid strands and the longitudinal grid strands is not particularly limited, but it is preferred that the cross-sectional area with the active material be high and that the shape facilitate packing of the active material into the grid plate. The cross-sectional shape of the thick strands and thin strands constituting the lateral grid strands and longitudinal grid strands may specifically be a rhombus, a hexagon, or the like that is long in the thickness direction.

In the present specification, the thin strands and thick strands constituting the longitudinal grid strands are referred to as thin longitudinal strands and the thick longitudinal strands, respectively, and the thin strands and thick strands constituting the lateral grid strands are referred to as thin lateral strands and thick lateral strands, respectively, in order to facilitate description of the configuration of the case in which the longitudinal grid strands and lateral grid strands are both composed of thick strands and thin strands. The thin strands and thick strands constituting the longitudinal grid strands are thereby differentiated from the thin strands and thick strands constituting the lateral grid strands.

It is preferred that the plurality of longitudinal grid strands be composed of thin longitudinal strands and thick longitudinal strands and that the thin longitudinal strands and thick longitudinal strands be arranged in alternating fashion in order to prevent active material from falling away and to reliably hold the active material in place.

In the grid, the electric resistance increases together with the distance from the plate lug section, and the loss of voltage generated by the grid strands increases with the distance from the plate lug section. Accordingly, the current that flows between the active material and the grid strands in locations far from the plate lug section is limited, and active charge and discharge reactions of the active material in locations far from the plate lug section are less likely. In order to prevent such a state from occurring, it is preferred that the grid strands be arranged so that the ratio of the number of thin lateral strands disposed in a fixed unit area in relation to the number of thick lateral strands in a region near one of the lateral frame strands set at a distance from the plate lug section is less than the ratio of the thin lateral strands in a fixed unit area in relation to the number of thick lateral strands in a region adjacent to the other lateral frame strand to which the plate lug section is provided. Accordingly, in a preferred mode of the present invention, two regions are provided; i.e., a first region in which the ratio of the number of thin lateral strands to thick lateral strands is a first ratio in one lateral frame strand side on which the plate lug section is disposed and in the other lateral frame strand side in a position set at a distance from the plate lug section; and a second region in which the ratio of the number of thin lateral strands to the number of thick lateral strands is a second ratio that is less than the first ratio.

The ratio of the number of thin lateral strands to the number of thick lateral strands in the first and second regions is not particularly limited, but it is preferred that the ratio of the number of thick lateral strands and the number of thin lateral strands be set so that four thin lateral strands are aligned adjacent to a single thick lateral strand in the first region; and that three thin lateral strands are aligned adjacent to a single thick lateral strand in the second region. When the thick lateral strands and thin lateral strands are provided in such a ratio, the active material paste can be readily packed into the grid while the electrical resistance of the grid increases (drop in voltage) together with the distance from the plate lug section.

[Relationship Between the Size of the Thin Strands and the Size of the Thick Strands]

The size (cross-sectional area) of the thick lateral strands and the thick longitudinal strands may be the same or different. The size of the thick lateral strands and the size of the thick longitudinal strands may be made different with consideration given to the casting characteristics of the grid plate. For example, when the size of the thick lateral strands is made to be greater than the size of the longitudinal thick strands, and the grid plate is die-cast using gravity die casting in a state in which the cavity for die casting the lateral grid strand is oriented facing the longitudinal direction in the mold for die casting the grid strands, a large amount of molten lead can be made to smoothly flow through the interior of the cavity (a cavity that extends in the longitudinal direction) having a large cross-sectional area for die casting the thick lateral strands. Therefore, the flow of the molten metal into the cavity for die casting the longitudinal grid strands can be smoothly carried out and die casting can be facilitated.

The relationship between the size of the thick strands and the size of the thin strands is suitably set with consideration given to the ease of packing the active material, the service life of the plate, and the like. In a preferred mode of the present invention, the value obtained by dividing the width of the thick strands by the width of the thin strands, and the value obtained by dividing the thickness of the thick strands by the thickness of the thin strands are used as evaluation values of the width and thickness of the thick strands and the width and thickness of the thin strands on the basis of the result of verifying the examples described below; and the relationship between the size of the thick strands and the size of the thin strands is set so that evaluation values are both accommodated within a range of 1.1 to 1.5.

In other words, the relationship between the size of the thick strands and the size of the thin strands is set so that the value obtained by dividing the width of the thick longitudinal strands by the width of the thin longitudinal strands, the value obtained by dividing the thickness of the thick longitudinal strands by the thickness of the thin longitudinal strands, the value obtained by dividing the width of the thick lateral strands by the width of the thin lateral strands, and the value obtained by dividing the thickness of the thick lateral strands by the thickness of the thin lateral strands, are in a range of 1.1 to 1.5.

For example, in the case that the thickness and width of the thick strands are fixed, the cross-sectional area of the thin strands is fixed, and the thickness of the thin strands is varied, the thickness of the thin strands is increased and the width is reduced when the evaluation value of the thickness of the thick strands is less than 1.1. Therefore, it is more difficult for the active material to flow below the thick strands and a portion of the thick strands may not be covered with active material because the space formed below the thin strands is reduced on the lower surface (reverse surface) side of the grid plate when one end side of the grid plate in the thickness direction is turned upward and the active material is packed into the grid plate. In this case, it is more difficult to reliably hold the packed active material because the width of the thin strands is excessively narrow, and the active material more readily falls away from the grid plate when the plate is set in an erect orientation in order to move from the step for packing the active material to the step for aging and drying the active material.

Also, in the case that the thickness and width of the thick strands are fixed, the cross-sectional area of the thin strands is fixed, and the width of the thin strands is varied, the thickness of the thin strands is increased when the evaluation value of the thickness of the thick strands is less than 1.1. However, the width becomes excessively great, the distance between the thin strands and the thick strands becomes excessively narrow, and the active material cannot be made to smoothly flow when the active material is packed into the grid plate.

Furthermore, in the case that the thickness and width of the thin strands are fixed, the cross-sectional area of the thick strands is fixed, the thickness of the thick strands is varied, and the resulting evaluation value of the thickness of the thick strands is less than 1.1, the thickness of the thick strands is excessively increased and the thickness of the thick strands can no longer be set to be less than the thickness of the frame section.

Also, in the case that the thickness and width of the thin strands are fixed, the cross-sectional area of the thick strands is fixed, the width of the thick strands is varied, and the resulting evaluation value of the width of the thick strands is less than 1.1, the width of the thick strands becomes excessively great, the distance between the thick strands and the thin strands becomes narrow, and the active material can no longer be made flow smoothly when the active material is packed into the grid plate.

Furthermore, in the case that the thickness and width of the thick strands are fixed, the cross-sectional area of the thin strands is fixed, the thickness of the thin strands are varied, and the resulting evaluation value of the thickness of the thick strands is greater than 1.5, the width of the thin strands becomes excessively great and the active material can no longer be made flow smoothly when the active material is packed into the grid plate.

Also, in the case that the thickness and width of the thick strands are fixed, the cross-sectional area of the thin strands is fixed, the width of the thin strands is varied, and the resulting the evaluation value of the width the thick strands is greater than 1.5, the thickness of the thin strands becomes excessively great, the space formed below the thin strands is insufficient when the active material is packed, the active material cannot be made to move around to the space below the thick strands, and the end faces of the thick strands may remain exposed.

Furthermore, in the case that the thickness and width of the thin strands are fixed, the cross-sectional area of the thick strands is fixed, the thickness of the thick strands is varied, and the resulting the evaluation value of the thickness of the thick strands is greater than 1.5, then the thickness of the thick strands becomes excessively great and the thickness of the thick strands cannot be brought below the thickness of the frame section.

Also, in the case that the thickness and width of the thin strands are fixed, the cross-sectional area of the thick strands is fixed, the width of the thick strands is varied, and the resulting evaluation value of the width of the thick strands is greater than 1.5, then the width of the thick strands becomes excessively great, the distance between the thick strands and the thin strands becomes narrow, and the active material can no longer be made to flow smoothly when the active material is packed into the grid plate.

The width and thickness of the thick strands and the width and thickness of the thin strands can be set to a suitable value by ensuring that the evaluation values of the width and thickness of the thick strands are within the range of 1.1 to 1.5. Accordingly, the service life of a battery can be extended because the active material can be made to flow smoothly when the active material is packed into the grid plate, a portion of the grid can be prevented from remaining exposed, and the active material can be reliably held in the grid plate.

[Active Material]

Active material prepared in the form of a paste is packed into the grid plate when the plate for a lead acid storage battery is formed. The active material of the electrode is not particularly limited, but is preferably made by kneading together water, sulfuric acid, a lead powder containing lead monoxide, and the like (cut fiber, carbon powder, lignin, barium sulfate, red lead, and the like may be added in accordance with the characteristics of the positive and negative electrodes). The amount of active material to be packed is not particularly limited as long as the strands (thick and thin strands) formed inside the frame strands are completely hidden, but the active material is preferably packed to the thickness of the frame strands or greater.

[Method for Manufacturing a Grid Plate]

A grid plate may be manufactured using gravity die casting (GDC), continuous casting, expanding, or punching, but the grid plate of the present invention is preferably manufactured using gravity die casting. Gravity die casting is a die casting method in which a starting material metal (alloy) for forming a grid plate is melted, the molten metal (alloy) is poured and cast by gravity into a metal mold composed of a material that can withstand the temperature of the molten metal. The reason that gravity die casting is preferred is that with gravity die casting, there is no theoretical upper limit to the thickness of the grid that can be cast, a grid having thick grid strands and thin grid strands is readily manufactured, and the resulting collection characteristics and corrosion resistance are excellent.

[Plate]

The plate according to the present invention is fabricated by packing the above-described paste-form active material into the grid plate using a paste packing machine, and then aging and drying the assembly. The time and temperature of the aging and drying are not particularly limited, but are preferably adjusted to suitable values in accordance with the thickness of the grid plate and the physical properties of the active material.

[Lead Acid Storage Battery]

Figure 16:
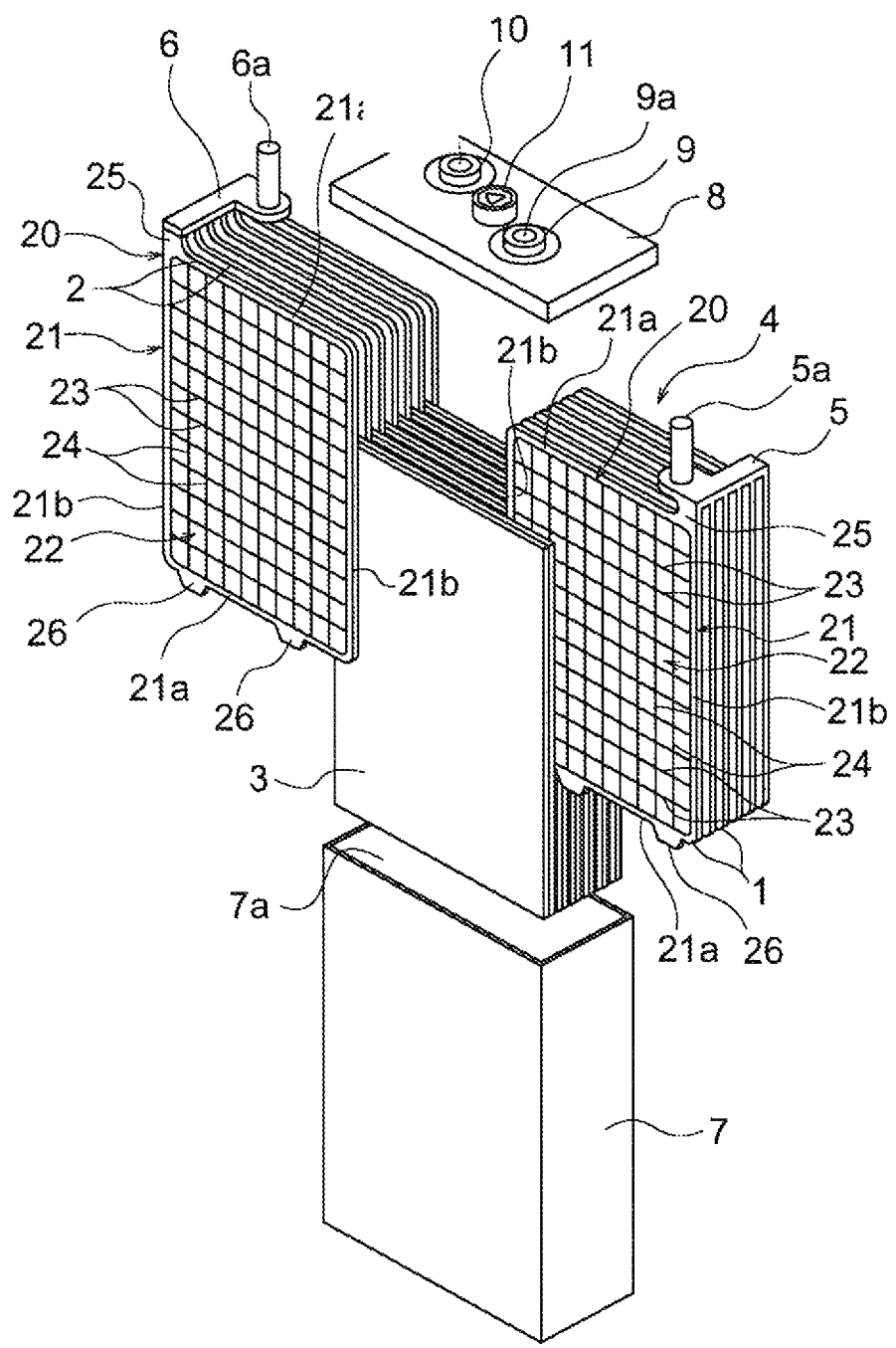
FIG. 16 is an exploded perspective view showing an example of the configuration of a lead acid storage battery.

The configuration of the lead acid storage battery according to the present invention is not particularly limited as long as at least the grid plate according to the present invention is used as the positive plate. As described above, the lead acid storage battery is fabricated from a positive plate, a negative plate, dilute sulfuric acid as the electrolyte, a separator (a retainer or the like made of glass fiber), a container, a lid, and the like. For example, the positive plate 1 and the negative plate 2 are layered in alternating fashion with separators disposed between the positive plates 1 and the negative plates 2, as shown in FIG. 16. The plate lug sections of the same polarity plate are linked together with straps 5, 6 to form a-plate group 4. The-plate group 4 is placed in a container 7 and sealed with lid. Dilute sulfuric acid is poured and then made to undergo formation to complete the lead acid storage battery.

[Configuration of Specific Embodiments]

Next, the configuration of specific embodiments of the present invention will be described with reference to the drawings.

FIG. 1 shows an embodiment of the grid plate 20 according to the present invention. The grid plate 20 in the diagram is provided with a frame section 21 having a rectangular profile shape, and a grid 22 formed inside the frame section 21. The frame section 21 has a pair of lateral frame strands 21*a*, 21*a* that extend in the lateral direction and that are in an opposing arrangement in the longitudinal direction, and a pair of longitudinal frame strands 21*b*, 21*b* that extend in the longitudinal direction and that are in an opposing arrangement in the lateral direction. A plate lug section 25 for connecting straps (not shown) is integrally formed in one of the lateral frame strands 21*a* of the frame section 21. A pair of leg sections 26, 26 that hold the lower end of the frame section 21 above the bottom wall and that are in contact with the bottom surface of the cell chamber when the-plate group is inserted into the cell chamber of the container is formed in the other lateral frame strand 21*a* of the frame section 21.

The grid 22 is composed of a plurality (26 in the example shown in the drawing) of lateral grid strands 23, 23, . . . provided so as to extend parallel to the lateral frame strands 21*a* and arranged at fixed intervals in the lengthwise direction of the longitudinal frame strand 21*b*; and a plurality (9 in the example shown in the drawing) of longitudinal grid strands 24, 24, . . . provided so as to extend parallel to the lateral frame strands 21*b* and arranged at fixed intervals in the lengthwise direction of the lateral frame strand 21*a*. The lateral grid strands 23, 23, . . . and the longitudinal grid strands 24, 24, . . . intersect at right angles to thereby form a grid 22.

The lateral grid strands 23 have a plurality (21 in the example shown in the drawing) of thin strands 23*a* having a cross-sectional area that can withstand corrosion for the service life period of the lead acid storage battery, and a plurality (5 in the example shown in the drawing) of thick strands 23*b* that have a larger cross-sectional area than the thin strands 23*a*; and the thick strands 23*b* and the thin strands 23*a* are arrayed so that the strands adjacent to the thick strands 23*b* are thin strands 23*a*.

Similarly, the longitudinal grid strands 24 have a plurality (five in the example in the diagram) of thin longitudinal strands 24*a* having a cross-sectional area that can withstand corrosion over the service life period of the lead acid storage battery, and a plurality (four in the example in the diagram) of thick longitudinal strands 24*b* having a greater cross-sectional area than the thin longitudinal strands 24*a*. The thick strands 24*b* and thin strands 24*a* are arrayed so that the strands adjacent to the thick longitudinal strands 24*b* are thin longitudinal strands 24*a*.

In the present specification, the thin strands 23*a* and thick strands 23*b* constituting the lateral grid strands 23 are referred to as thin lateral strands and the thick lateral strands, respectively, and the thin strands 24*a* and thick strands 24*b* constituting the longitudinal grid strands 24 are referred to as thin longitudinal strands and thick longitudinal strands, respectively, in order to differentiate between the thin strands 23*a* and thick strands 23*b* constituting the lateral grid strands 23 and the thin strands 24*a* and thick strands 24*b* constituting the longitudinal grid strands 24.

Figure 2:
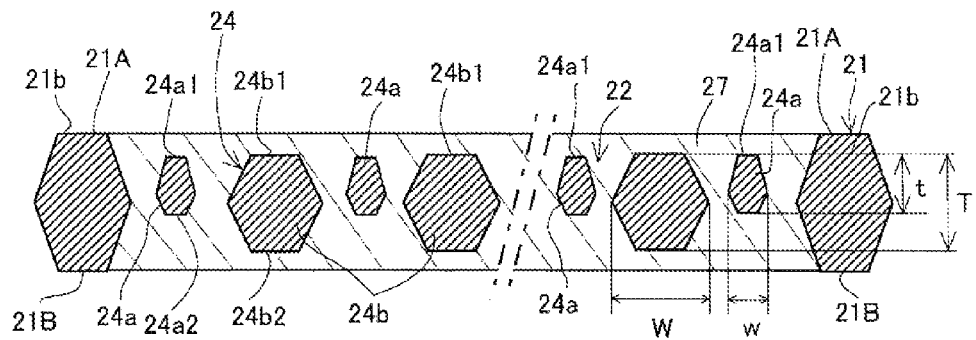
FIG. 2 is an enlarged cross-sectional view sectioned along the II-II line of FIG. 1 and shows a plate with active material packed into the grid plate of FIG. 1.
Figure 3:
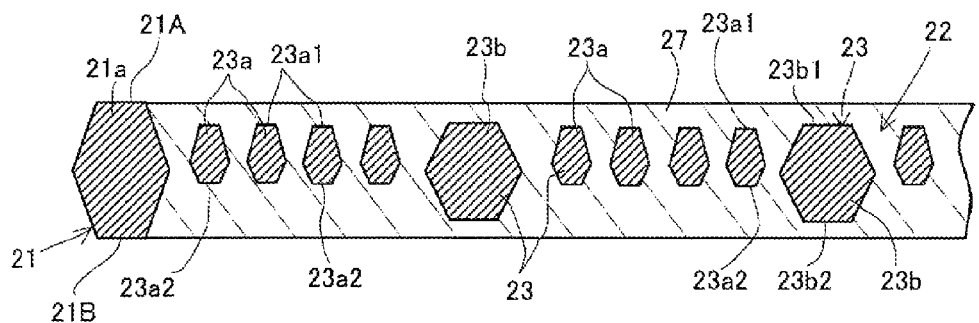
FIG. 3 is an enlarged cross-sectional view sectioned along the line of FIG. 1 and shows a plate with active material packed into the grid plate of FIG. 1.
Figure 4:
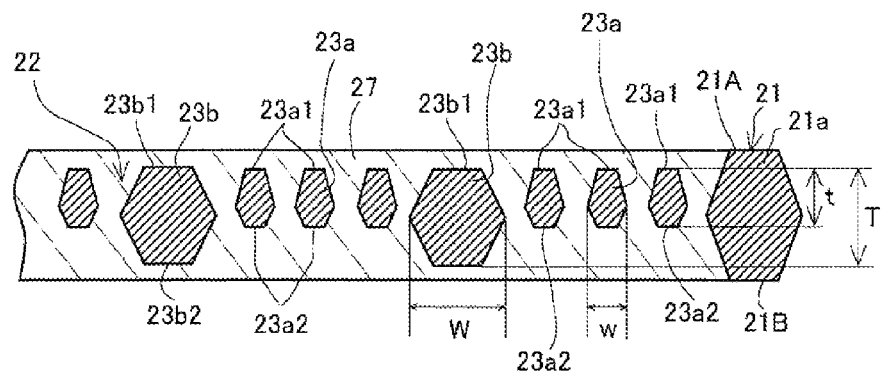
FIG. 4 is an enlarged cross-sectional view sectioned along the IV-IV line of FIG. 1 and shows a plate with active material packed into the grid plate of FIG. 1.

In the present embodiment, the lateral frame strand 21*a* (see FIG. 3) and the longitudinal frame strand 21*b* (see FIG. 2) constituting the frame section 21 are formed so as to have a longitudinally long hexagonal cross-sectional shape, as shown in FIGS. 2 to 4. The thin lateral strands 23*a* (see FIG. 3) and thin longitudinal strands 24*a* (see FIG. 2) constituting the grid 22 having a longitudinally long hexagonal cross-sectional shape, and the thick lateral strands 23*b* (see FIG. 3) and thick longitudinal strands 24*b* (see FIG. 2) have a substantially regular hexagonal cross-sectional shape.

The plurality of thick lateral strands 23*b* and thick longitudinal strands 24*b* have a predetermined width W and a thickness T that is less than the thickness of the frame section 21, as shown in FIGS. 2 to 4; and are arranged so that end portions 23*b*1, 24*b* of one end side and the end portions 23*b*2, 24*b*2 of the other end side in the thickness direction are positioned further inside the end face 21A of one end side and the end face 21B of the other end side of the frame section 21 in the thickness direction, and so that the portions 23*b*1, 24*b*1 of one end side in the thickness direction are positioned in the same plane.

The plurality of thin lateral strands 23*a* and thin longitudinal strands 24*a* are formed so as to have a width w and a thickness t that are less than the width W and the thickness T of the thick lateral strands 23*b* and the thick longitudinal strands 24*b*. The end portions 23*a*1 and 24*a*1 of one end side of the plurality of thin lateral strands 23*a* and the thin longitudinal strands 24*a*, respectively, in the thickness direction are provided so as to be positioned in the same plane in which the end portions 23*b*1 and 24*b*1 of one end side of the plurality of thick lateral strands 23*b* and thick longitudinal strands 24*b* in the thickness direction are arranged.

Figure 5:
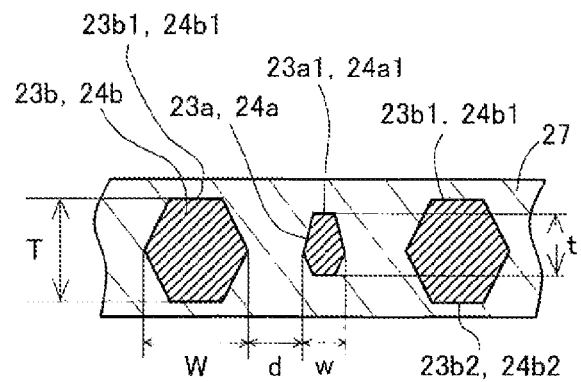
FIG. 5 is a cross-sectional view showing a modified example of the manner in which the grid plate strands are arranged in an embodiment of the present invention.

In the present invention, the end portions 23*a*1 and 24*a*1 of one end side of the plurality of thin lateral strands 23*a* and thin longitudinal strands 24*a*, respectively, in the thickness direction may be provided so as to be closer to the plane in which the end portions 23*b*1 and 24*b*1 of one end side of the plurality of thick lateral strands 23*b* and thick longitudinal strands 24*b* in the thickness direction are arranged, but it is not necessarily required that the end portions 23*a*1 and 24*a*1 of one end side in the thickness direction be precisely positioned in the same plane as the end portions 23*b*1, 24*b*1 of one end side of the plurality of thick lateral strands 23*b* and thick longitudinal strands 24*b* in the thickness direction. For example, the end portions 23*a*1, 24*a*1 of one end side of the plurality of thin lateral strands 23*a* and thin longitudinal strands 24*a* may positioned slightly further inward in the thickness direction than the end portions 23*b*1, 24*b*1 of one end side of the thick lateral strands 23*b* and thick longitudinal strands 24*b*, as shown in FIG. 5.

In the present embodiment, the thin longitudinal strands 24*a* and thick longitudinal strands 24*b* constituting the longitudinal grid strands 24 are provided so that the thick longitudinal strands 24*b* and the thin longitudinal strands 24*a* are aligned in alternating fashion in the lengthwise direction of the lateral frame strand 21*a*, as shown in FIGS. 1 and 2.

In the present embodiment, a first region A1 positioned on one lateral frame strand 21*a* side on which the plate lug section 25 is provided, and a second region A2 position on the other lateral frame strand 21*a* side in a position set at a distance from the plate lug section 25, are established in the main plane (the plane having the greatest surface area) of the grid plate. The main plane of the grid plate is divided into a first region A1 and a second region A2 aligned in the longitudinal direction. The number of thin strands provided in the first region is made to differ from that in the second region so that a second ratio is less than a first ratio, where the first ratio is the ratio of the number of thin lateral strands 23*a* that exist per fixed unit of surface area in relation to the number of thick lateral strands 23*b* in the first region; and the second ratio is the ratio of the number of thin lateral strands 23*a* that exist per fixed unit of surface area in relation to the number of thick lateral strands 23*b* in the second region A2. In the example in the drawing, the thick lateral strands 23*b* and thin lateral strands 23*a* constituting the lateral grid strands 23 are provided so that four thin lateral strands 23*a* are aligned between mutually adjacent thick lateral strands 23*b*, 23*b* in the first region A1, as shown in FIGS. 1 and 3, and three thin lateral strands 23*a* are aligned between the mutually adjacent thick lateral strands 23*b*, 23*b* in the second region A2, as shown in FIGS. 1 and 4, where the lateral frame strands 21*a*, 21*a* are regarded as thick strands. In other words, the interval between the thick lateral strands 23*b* in the second region is narrower than the interval between the thick lateral strands 23*b* in the first region A1.

When a plate for a lead acid storage battery is manufactured using the grid plate, the grid plate is placed on a conveyor belt or other conveyance means to convey the grid plate in a state in which the thickness direction of a cast grid plate 20 is oriented in the longitudinal direction, and in the conveyance process the active material paste is fed to the grid plate 20 from a paste packing machine disposed above, the active material is packed into the grid plate, the packed active material is pressed from one end side (upper end side) in the thickness direction of the grid plate to the other end side (lower end side) to cause the active material to flow through the grid openings and thereby fill the entire grid with paste.

In the present invention, the thick lateral strands and the thick longitudinal strands are provided with a function for keeping the grid in a predetermined shape over the service life period of the battery. Therefore, the number of thick lateral strands and thick longitudinal strands is set to the required number of strands when the grid plate of the present invention is manufactured in order to maintain the shape of the grid for a desired service life period, and the number of thick lateral strands and thick longitudinal strands is set so as not to be excessive, in order that the amount of active material that can be packed into the grid plate is not reduced. Similarly, the cross-sectional area of the thick lateral strands and thick longitudinal strands is set to the minimum size necessary (so as not to be excessively great) so that the amount of active material that can be packed into the grid plate is not reduced and so that the shape of the grid body will be preserved over a desired service life period.

On the other hand, the cross-sectional area of the thin lateral strands and thin longitudinal strands is set to a value (a value less than the cross-sectional area of the thick lateral strands and thick longitudinal strands) that is suitable for holding a predetermined shape for a desired service life period, and for maintaining the function of holding the active material, under the assumption of reliance on the strength of the thick lateral strands and thick longitudinal strands. The width of the thin lateral strands and thin longitudinal strands is set to a value that can ensure space for facilitating the flow of active material paste between the thick lateral strands and thick longitudinal strands. When the width of the thin lateral strands and thin longitudinal strands is excessive, the amount of active material that can be packed into the grid plate is reduced and it will no longer be possible to achieve the effects of the present invention, namely: to facilitate the flow of active material when the active material is packed into the grid plate, to increase the ease with which the active material is packed, and to prevent a state in which a portion of the grid body is not covered with active material. When the cross-sectional area of the thin lateral strands and thin longitudinal strands is excessively low, corrosion of the thin lateral strands and thin longitudinal strands prematurely reaches into deep parts and the mechanical strength is reduced. Therefore, the shape of the thin lateral strands and thin longitudinal strands cannot be maintained even with reliance on the thick lateral strands and the thick longitudinal strands, and the function for holding the active material is diminished.

When the thickness of the frame section is excessively low, the thickness of the thick strands set to be less than the thickness of the frame section becomes excessively low, the period of time until corrosion of the grid strands reaches allowable limit is reduced, and the service life of the plate tends to be shortened. Also, when the thickness of the frame section becomes excessively low, the ability to hold the active material may be reduced because the thickness of the thin strands becomes excessively low. When the thickness of the frame section is 5 mm or more, and the thickness of the thick lateral strands and thin lateral strands and the thickness of the thick longitudinal strands and thin longitudinal strands constituting the grid strands can be set to a suitable value in a range of 5 mm or less, it is possible to answer the need for extending the service life of the plate and the need for increasing the ease of packing the active material without reducing the ability of holding the active material.

The frame section is preferably formed in a rectangular shape having about the same size as the frame section of a plate used in current industrial lead acid storage batteries, e.g., a rectangular shape have a lengthwise dimension of 370 to 390 mm and a crosswise dimension of 130 to 150 m.

When the above-described values are taken as the dimensions of the frame section for a grid plate, a relatively large plate can be fabricated, and a battery with a large discharge capacity can be fabricated by using a large number of the plates. The above-described dimensions of a grid plate are about the same as the dimensions of a grid plate using in industrial lead acid storage batteries. Therefore, the container, lid, and the like of a conventional industrial lead acid storage battery can be used without modification, the discharge capacity can be increased, and a lead acid storage battery having a long service life can be obtained.

Figure 7:
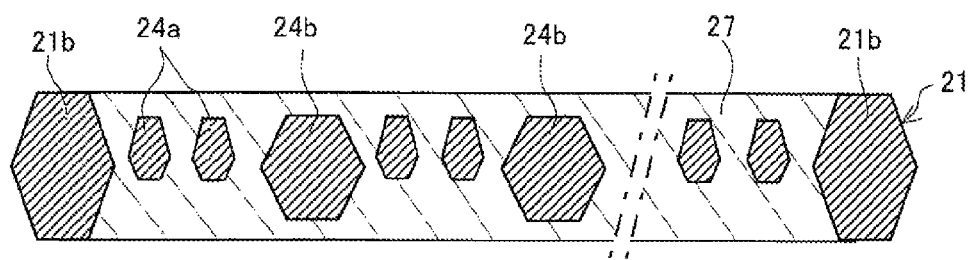
FIG. 7 is a cross-sectional view showing another modified example of the manner in which the grid plate strands are arranged in an embodiment of the present invention.

In the example shown in FIG. 1, longitudinal grid strands are provided so that the thick longitudinal strands and thin longitudinal strands are aligned in alternating fashion along the lengthwise direction of the lateral frame strands 21a, 21b, but the present invention is not limited to the case in which longitudinal grid strands are configured in the manner shown in FIG. 1, and it is also possible to configure the longitudinal grid strands so that, e.g., two thin longitudinal strands 24a are aligned adjacent to the thick longitudinal strands 24b, as shown in FIG. 7.

In the embodiments described above, the lateral grid strands and longitudinal grid strands are both composed of thin strands and thick strands; however, in the present invention, at least one among the longitudinal grid strands and the lateral grid strands may have a configuration in which a plurality of thin strands have a cross-sectional area that can withstand corrosion over the service life period of the lead acid storage battery and a plurality of thick strands have a greater cross-sectional area than the thin strands, and in which the thick strands and thin strands are arrayed so that the strands adjacent to the thick strands are thin strands. There is no limitation to the case in which the longitudinal grid strands and lateral grid strands are configured in the manner of the embodiments described above; for example, it is possible for only the lateral grid strands to be composed of thick lateral strands and thin lateral strands, and the longitudinal grid strands to be composed of only longitudinal grid strands.

In the case that only the lateral grid strands are composed of thick lateral strands and thin lateral strands, and the longitudinal grid strands are composed of only thick longitudinal grid strands, it is preferred that two regions be provided, i.e., a first region in which the ratio of the number of thin lateral strands to thick lateral strands is a first ratio in one lateral frame strand side on which the plate lug section is disposed and in the other lateral frame strand side in a position set at a distance from the plate lug section; and a second region in which the ratio of the number of thin lateral strands to the number of thick lateral strands is a second ratio that is less than the first ratio. The electrical resistance in the grid portion is thereby prevented from tending to increase as the distance from the plate lug section increases.

In the embodiments described above, the main plane of the grid plate is divided into two regions in the longitudinal direction (longitudinal) and the main plane of the grid plate is provided with a first region A1 position on one of the lateral grid strand sides on which the plate lug section is provided, and a second region A2 positioned on the other lateral frame section side set at a distance from the plate lug section; and the number of thin lateral strands in the first and second regions is set so that the number of thin lateral strands arranged between the mutually adjacent thick lateral strands in the first region A1 is greater than the number of thin lateral strands arranged between the mutually adjacent thick lateral strands in the second region A2, where the one of the lateral frame strands and the other of the lateral frame strands are regarded as thick lateral strands. However, in the present invention, in the case that the main plane of the grid plate is divided into a plurality of regions and the ratio of the number of thin lateral strands to the number of thick lateral strands is made to be different for each region, the manner in which the main plane of the grid plate is divided into a plurality of regions is not particularly limited to the example described above as long as the ratio of the number of thin lateral strands disposed in a fixed unit area in relation to the number of thick lateral strands in the region near the other lateral frame section set at a distance from the plate lug section is made to be less than the ratio of the number of thin lateral strands disposed in a fixed unit area in relation to the number of thick lateral strands in a region adjacent to the one lateral grid strand on which the plate lug section is provided. For example, one or more regions may be set between the first region A1 and the second region A2 to divide the main plane of the grid plate into three or more regions, and the number of thin lateral strands and the number of thick lateral strands in each region may be set so that the ratio of the number of thin lateral strands to the number of thick lateral strands provided per fixed unit area is reduced in a stepwise fashion in progression from the region disposed on one lateral grid strands side on which the plate lug section is disposed to the region disposed on the other lateral frame section side (i.e., so that the distance between thick lateral strands is reduced in a stepwise fashion).

EXAMPLES

Examples of the present invention are described below with reference to the drawings.

[Fabrication of a Grid Plate]

Tin (1.0 to 1.8 mass %) and calcium (0.05 to 0.1 mass %) were admixed with lead and the fabricated lead alloy was melted. Positive grid plates A, B, C, D, and E were fabricated by gravity die casting using five different types of molds. The grid plates A and B are comparative examples, and grid plates C to E are examples of the present invention.

Grid Plate A

Comparative Example 1

Figure 12:
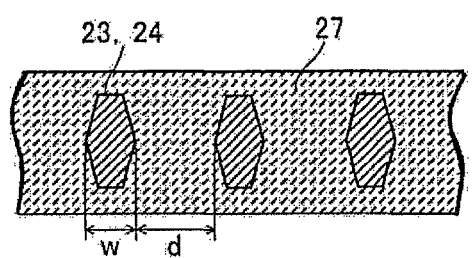
FIG. 12 is a cross-sectional view showing the state in which active material has been packed into a plate which has been configured by packing active material into a conventional grid plate.

The grid plate A corresponds to the grid plate shown in FIG. 12. In the grid plate A, the longitudinal dimension of the frame section was 385 mm, the lateral dimension was 140 mm, the thickness was 3.6 mm, and the width was 3.2 mm. Longitudinal grid strands and lateral grid strands having a hexagonal cross-sectional shape in which the thickness was greater than the width were formed at equidistant intervals inside the frame section, and all of the longitudinal and lateral grid strands were formed with strands (ribs) having the same thickness, as shown in FIG. 12. The number of longitudinal and lateral grid strands was 9 and 29 respectively. The thickness T of the strands constituting the longitudinal and lateral grid strands was 3.2 mm, and the width w was 2.4 mm. The resulting grid plate was a conventional grid plate. The intervals between the center lines of the longitudinal and lateral grid strands were equidistant (likewise in the examples below).

Grid Plate B

Comparative Example 2

Figure 13:
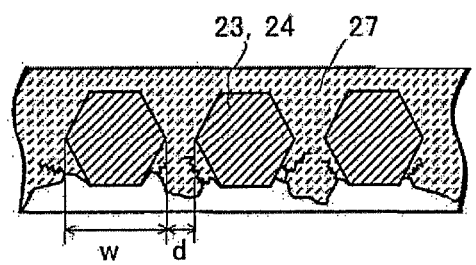
FIG. 13 is a cross-sectional view showing an example of the packed state of active material in the case that only thick strands are used.

The grid plate B corresponds to the grid plate shown in FIG. 13. In the grid plate B, the longitudinal dimension of the frame section was 385 mm, the lateral dimension was 140 mm, the thickness was 5.8 mm, and the width was 4.4 mm. The cross-sectional shape of the longitudinal and lateral grid strands formed inside the frame section was a hexagonal shape in which the thickness was greater than the width, and all of the longitudinal and lateral grid strands were formed with strands having a thickness T of 5.4 mm and a width W of 4.3 mm. The number of longitudinal and lateral grid strands was 9 and 26 respectively.

Grid Plate C

Example 1

In the grid plate C, the longitudinal grid strands and the lateral grid strands were disposed inside the grid strands in the pattern shown in FIG. 1. In the same manner as the grid plate B, the longitudinal dimension of the frame section was 385 mm, the lateral dimension was 140 mm, the thickness was 5.8 mm, and the width was 4.4 mm. Longitudinal grid strands and lateral grid strands having thick strands and thin strands, as shown in FIG. 1, were formed inside the grid strands. The cross-sectional shape of the thick longitudinal strands 24$b$ and the thick lateral strands 23$b$ was a hexagonal shape in which the thickness was greater than the width. The thickness was 5.4 mm and the width was 4.3 mm. The cross-sectional shape of the thin longitudinal strands 24$a$ and the thin lateral strands 23$a$ was a hexagonal shape in which the thickness was greater than the width. The thickness was 3.6 mm and the width was 2.8 mm. In the grid plate C, the end faces 24$a$1, 23$a$1 of one end side in the thickness direction of the thin longitudinal strands 24$a$ and the thin lateral strands 23$a$, which were arranged facing upward when the active material was being packed, were positioned in the same plane as the end faces 24$b$1 and 23$b$1 of the one end side in the thickness direction of the thick longitudinal strands 24$b$ and the thick lateral strands 23$b$, as shown in FIGS. 2 to 4.

Grid Plate D

Example 2

In the grid plate D, the longitudinal dimension of the frame section was 385 mm, the lateral dimension was 140 mm, the thickness was 5.8 mm, the width was 4.4 mm, as with the grid plate B. Among the strands formed inside the frame section, the cross-sectional shape of the lateral grid strands was a hexagonal shape in which the thickness was greater than the width in the same manner as the grid plate A (FIG. 12), and all of the lateral grid strands had a thickness of 3.2 mm and a width of 2.4 mm. The number of lateral grid strands was 26. On the other hand, thick longitudinal strands and thin longitudinal strands were provided as the longitudinal grid strands, and the cross-sectional shape of the thick longitudinal strands and the thin longitudinal strands was a hexagonal shape in which the thickness was greater than the width, as with the grid plate C. In this case, the thickness of the thick longitudinal strands was 5.4 mm and the width was 4.3 mm; and the thickness of the thin longitudinal strands was 3.6 mm and the width was 2.8 mm. The end portions 24$a$1, 23$a$1 of one end side in the thickness direction of the thin longitudinal strands 24$a$ and the thin lateral strands 23$a$, which were arranged facing upward when the active material was being packed, were positioned in the same plane as the end faces 24$b$1, 23$b$1 of the one end side in the thickness direction of the thick longitudinal strands 24$b$ and the thick lateral strands 23$b$. The longitudinal grid strands were arrayed in a pattern in which the thick longitudinal strands and the thin longitudinal strands were arranged in alternating fashion in the same manner as that shown in FIG. 1.

Grid Plate E

Example 3

In the grid plate E, the longitudinal dimension of the frame section was 385 mm, the lateral dimension was 140 mm, the thickness was 5.8 mm, and the width was 4.4 mm in the same manner as the grid plate B. Among the grid strands formed inside the frame section, the longitudinal grid strands were formed using similarly configured strands having a hexagonal cross-section measuring 3.2 mm in thickness and 2.4 mm in width, as with the grid plate A. On the other hand, thick lateral strands and thin lateral strands were provided as the lateral grid strands, the thick lateral strands having a hexagonal cross-sectional shape with thickness of 5.4 and a width of 4.3 mm in the same manner as the grid plate C, and the thin lateral strands having a hexagonal cross-sectional shape with a thickness of 3.6 mm and a width of 2.8 mm. In this case as well, the end portions 24$a$1, 23$a$1 of one end side in the thickness direction of the thin longitudinal strands 24$a$ and the thin lateral strands 23$a$, which were arranged facing upward when the active material was being packed, were positioned in the same plane as the end faces 24$b$1, 23$b$1 of the one end side in the thickness direction of the thick longitudinal strands 24$b$ and the thick lateral strands 23$b$.

[Confirmation of the Packed State of the Active Material]

A packing test of the active material in which the active material paste is packed by a packing machine into the grid plates A, B, C, D, and E described above was performed, and aging and drying were then carried out to fabricate unformed positive plates.

The positive active material paste used in the packing test of the active material was fabricated by admixing 0.1 mass % of polyester fiber in relation to the mass of the lead powder that principally comprised lead monoxide, and then adding and kneading 12 mass % of water and 16 mass % of dilute sulfuric acid. The method for fabricating the positive active material is the same method as used in prior art.

[Packing Results]

The active material paste was packed into the grid plates A, B, C, D, and E. Described below are the results of a visual confirmation made of the packed state of the active material on the reverse side of the grid plates, which were facing downward during active material packing, and the results of a visual confirmation made of a cross section of the plates after the active material had been packed into the grid plates and manufacturing completed via drying and aging steps.

[Packed State on the Reverse Side of the Grid Plates]

In grid plate A, all of the grid strands were neatly embedded in the active material, and the packed state of the active material on the reverse side of the grid plate was good, as shown in FIG. 12.

In grid plate B, the active material could not be adequately packed on the reverse side of the grid plate, exposed portions of the grid strands were observed, and cracks were observed in the active material, as shown in FIG. 13.

In grid plate C, the thin grid strands 3 and thick grid strands 4 were embedded in the active material, and the packed state of the active material on the reverse side of the grid plate was good in the same manner as with grid plate A, as shown in FIG. 12.

In grid plates D and E as well, the packed state of the active material on the reverse side of the grid plate was observed to be good in the same manner as with grid plate C.

Based on the above results, the grid plates C, D, and E according to examples 1 to 3 of the present invention were confirmed to have good packing of the active material as with the conventional grid plate shown in FIG. 12.

[Fabrication of the Lead Acid Storage Battery]

The method for fabricating four types of lead acid storage battery using the above-described grid plates A, C, D, and E will be described below.

Positive active material fabricated using the method described above was packed into the grid plates A, C, D, E and then aged, and dried, the resulting plates being used as positive plates. In the grid plate B, the active material was not sufficiently packed toward the reverse side of the grid plate, which faces downward when the active material is packed; and portions in which the grid was exposed were observed on the reverse side of the plate, as shown in FIG. 13. Since it was clear that premature loss of capacity was highly likely in a battery incorporating such a grid plate, a lead acid storage battery having a positive plate that uses the grid plate B was not fabricated.

A grid plate fabricated using the method described below was used as the negative grid plate.

A lead alloy fabricated by adding 1.8 to 2.2 mass % of tin and 0.08 to 0.12 mass % of calcium to lead was melted, and a negative grid plate having a longitudinal dimension of 385 mm, a lateral dimension of 140 mm, and a thickness of 3.0 mm in a frame section was fabricated by gravity die casting. The lateral strands and the longitudinal strands inside the frame section were all formed by strands having a hexagonal cross-sectional shape with a thickness of 2.6 mm and a width of 1.8 mm.

The negative active material was fabricated in the following manner. First, 0.2 mass % of lignin, 0.1 mass % of barium sulfate, 0.2 mass % of ordinary commercially available graphite or another carbon powder, and 0.1 mass % of polyester fiber were admixed in relation to the mass of the lead powder in which lead monoxide was the main component. Next, 12 mass % of water was added and kneaded, and 13 mass % of dilute sulfuric acid was then added and the mixture was re-kneaded to fabricate an active material paste. The method for fabricating a negative active material was the same as conventionally carried out. The negative active material obtained in this manner was packed into the grid plate, and the assembly was aged and dried to obtain a negative plate.

The positive plate and negative plate were layered in alternating fashion with interjacent separators, and the plate lug sections of the same polarity plates were strapped together to fabricate a group of plates. The group of plates was placed in a container, dilute sulfuric acid was poured, and formation was carried out to fabricate a 2-V lead acid storage battery having a length of 90 mm, a width of 172 mm, and a height of 495 mm. Three each of batteries A, C, D, and E incorporating the grid plates A, C, D, and E were fabricated; and accelerated service life testing was carried out by trickle charging.

[Service Life Test of the Lead Acid Storage Battery]

The fabricated batteries were subjected to accelerated service life testing by trickle charging with a charge voltage of 2.23 V in a thermostat at 60° C. The charge current was limited to 0.05 CA or less in order to avoid placing a burden on the batteries. A trickle service life of one month for a lead acid storage battery placed in an atmosphere with an air temperature of 60° C. means that the trickle service life is one year in the case that the lead acid storage battery is placed in an atmosphere with an air temperature of 25° C. The batteries were removed one at a time, disassembled, and inspected once periods of one year, 5 years, and 10 years had elapsed in terms of converted years for the batteries provided to the test.

[Results of Service Life Testing]

Figure 14:
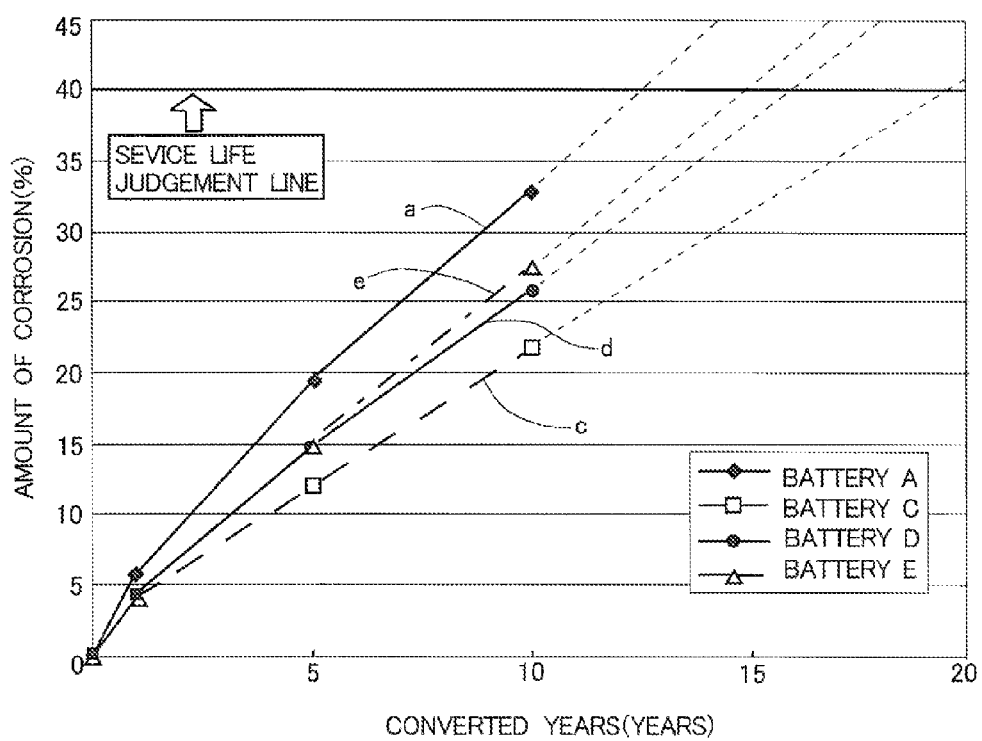
FIG. 14 is a graph showing the amount of grid corrosion as measured in a service life accelerated test carried out for the positive plate using a grid body according to various examples of the present invention, wherein the grid corrosion is shown in terms of converted years in which the elapsed time in the test is computed by conversion to actual years of use.

The grid plates A, C, D, E were sampled from the disassembled batteries; and the amount of corrosion of the grids was measured. The comparison results are shown in FIG. 14. In FIG. 14, the curves a, c, d, e show the measurement results of the batteries A, C, D, E, respectively. The amount of corrosion was measured using a method in which the grid plates were immersed in a strong alkaline solution to dissolve the corroded portions, and the amount of corrosion was calculated from the weight difference before and after dissolution.

There was substantially no difference in the amount of corrosion of the batteries after one year in terms of converted time, but the difference increased at 5 years and 10 years as the elapse of time progressed in terms of converted years. The point in time at which the amount of corrosion of the grid plate reached 40% was deemed to be the point at which the service life of the battery had ended. A service life judgment line was drawn and an extension line was drawn from the slope of 1 to 10 years, the battery service life determined to be the point at which the two lines intersected. It was possible to predict that battery service life would be about 12.5 years for battery A, about 19 years for battery C, about 16 years for battery D, and about 15 years for battery E. Results were obtained indicating that resistance to long-term corrosion progressed in the sequence of A, E, D, and C.

Based on the experimental results described above, it can be determined that a battery having a considerably longer service life than a conventional lead acid battery can be fabricated using the grid plate of the present invention. From the test results for the grid plates D, E, it was confirmed that an effect of extending service life is obtained even when only one among the group of longitudinal grid strands and the group of lateral grid strands is composed of thick strands and thin strands and when all of the other group of grid strands is composed of thin strands in the same manner as the grid plate A. However, the service life of the grid plates D, E was not extended to the degree that the service life of the grid plate C was extended. Therefore, it was apparent that a battery with a longer service life could be obtained when the longitudinal grid strands and the lateral grid strands are both composed of a combination of thick strands and thin strands (example 1).

[Fluctuation Reduction Test]

Next, three each of batteries A and C were fabricated, and the lead acid storage batteries were connected to a wind power generation device via a charger in a wind power generation apparatus. A fluctuation reduction test was performed in which charging and discharging were repeatedly performed in short intervals in a low-charge state, the operation conceived so that the lead acid storage batteries were charged using the output of the power generator and discharged to a electric power system, thereby compensating for fluctuations in the amount of power produced by the power generation device and smoothing the power fed from the power generation device to the electric power system.

In the fluctuation reduction test, the state of charge (SOC) was 60%, the charge current was 0.2 CA, the discharge current was 0.2 CA, and charging for one second and discharging at an ambient temperature of 25° C. for one second was repeated without a rest interval. The battery voltage was kept in a range of 1.80 V to 2.42 V per cell, and a 24-month (2-year) test was carried out. The SOC was kept at 60% throughout the interval of the test. A constant current was discharged at a discharge capacity of 0.1 CA at an ambient temperature of 25° C. each month. The test was ended when the battery voltage reached a discharge final voltage of 1.80 V per cell, and Ah was calculated from the discharge time to determine the discharge capacity. Changes in the measured discharge capacity are confirmed in this manner. The amount of degradation was judged by determining whether degradation had progressed until the battery reached its service life, using 70% capacity of the initial battery capacity as the service life judgment capacity, and using the state in which the battery capacity has reached 70% or less with respect to the initial capacity as the state in which service life has been reached.

In the fluctuation reduction test, accelerated service life testing was carried out by presuming 5000 cycles of repeated charging/discharging per day (about 17 seconds per cycle) in a wind power generation apparatus, and setting the charge/discharge cycle to be sufficiently shorter than the presumed charge/discharge cycle. In other words, a single charge/discharge is repeated in two seconds for 43200 cycles per day in the fluctuation reduction test. This corresponds to an accelerated service life test of 43200/5000=8.6 times.

[Fluctuation Reduction Test Results]

Figure 15:
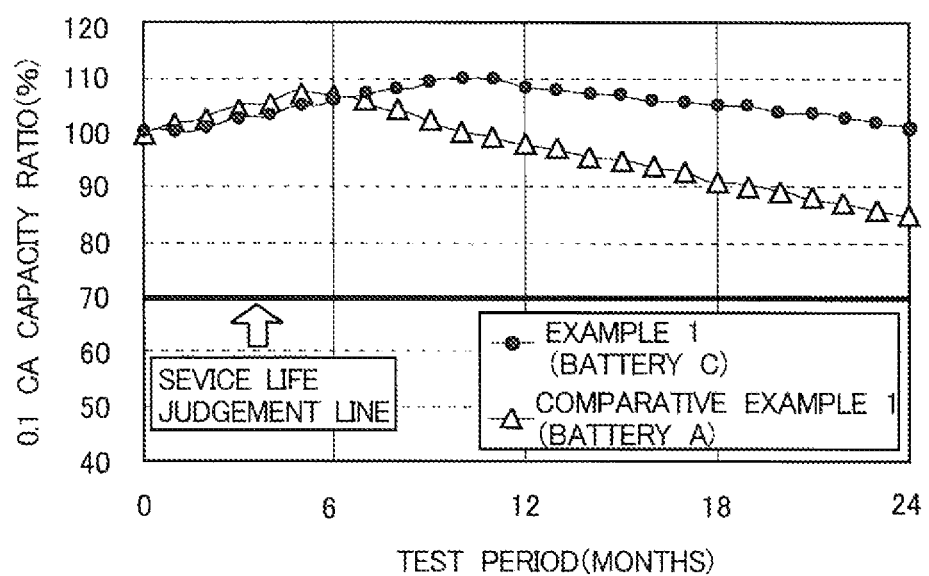
FIG. 15 is a graph showing the results of fluctuation reduction testing carried out for the examples of the present invention.

The results of the fluctuation reduction test are shown in FIG. 15. The 0.1 CA capacity ratio as the longitudinal axis of FIG. 15 is the ratio of 0.1 CA capacity in each month in relation to the 0.1 C capacity (initial capacity) at the start of the test. From FIG. 15, it is apparent that battery C maintained the initial capacity even after 24 months (2 years). Based on these results, it was estimated that battery C would maintain a service life of 2×8.6=17.2 years or more. On the other hand, battery A had a reduction in capacity to 85% of the initial capacity after 24 months had elapsed, and it was predicted from the slope of the curve that the capacity would be rapidly lost thereafter.

[Experiment for Investigating the Effect of the Difference in the Number of Thin Lateral Strands Between the Thick Lateral Strands]

Next, grid plates for a positive plate were fabricated as examples 4 to 11 in which the number of thin longitudinal strands disposed between mutually adjacent thick longitudinal strands in the longitudinal grid strands and the number of thin lateral strands disposed between thick lateral strands in the lateral grid strands were varied, wherein the longitudinal frame strands and the lateral frame strands constituting the frame section were regarded as thick longitudinal strands and thick lateral strands, respectively. Grid plates for a positive plate were fabricated as examples 12 to 33 in which the number of thin longitudinal strands between the thick longitudinal strands in the longitudinal grid strands was a single strand and the number of thin lateral strands disposed between the thick lateral strands in the lateral grid strands was varied in the side near the plate lug section and the side set at a distance from the plate lug section. An experiment was carried out to investigate how the state of charge of the active material and the electrical resistance of the grid parts are affected by the difference in the above configurations.

[Fabrication of Positive Grid Plates]

Tin (1.8 mass %) and calcium (0.08 mass %) were admixed with lead, and the entire mixture was melted into a lead alloy having 100 mass %. Positive grid plates were fabricated as examples 4 to 6 by gravity die casting using different molds, wherein the number of thin longitudinal strands disposed between mutually adjacent thick longitudinal strands in the longitudinal grid strands was varied (the longitudinal frame strands being regarded as thick longitudinal strands); and positive grid plates were fabricated as examples 7 to 11 wherein the number of thin lateral strands disposed between mutually adjacent thick lateral strands in the lateral grid strands was varied (the lateral frame strands being regarded as thick lateral strands).

The grid plate was divided into two regions, i.e., a first region positioned on the lateral frame strand side (plate lug side) on which the plate lug section is disposed, and a second region positioned on the lateral frame strand side (leg side) on which the leg sections are provided. Positive grid plates were fabricated as examples 12 to 21, wherein the number of thin lateral strands disposed between mutually adjacent thick lateral strands was varied in the first region on the plate lug side and the second region on the leg side.

Positive grid plates were fabricated as examples 22 to 27, wherein the number of thin lateral strands disposed between mutually adjacent thick lateral strands in the first region on the plate lug section side was 4, the number of thin lateral strands disposed between mutually adjacent thick lateral strands in the second region on the leg section side was 3, and the thickness and width of the thick strands (thick lateral strands and thick longitudinal strands) were varied. Positive grid plates were fabricated as examples 28 to 33, wherein the thickness and width of the thin strands (thin lateral strands and thin longitudinal strands) were varied.

In examples 4 to 33, the sizes of the frame sections of the grid plates were all the same. The longitudinal dimension of the frame section was 385 mm, the lateral dimension was 140 mm, and the thickness was 5.8 mm. The configuration of examples 4 to 33 are described in further detail below. In examples 4 to 33, the end sections on one end side of the plurality of thin longitudinal strands and the plurality of thin lateral strands in the thickness direction are positioned in the same plane as the plane in which the end sections on one end side of the thick longitudinal strands and the thick lateral strands in the thickness direction are arranged.

Example 4

In the grid plate of example 4, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands, as shown in FIG. 2, and the lateral grid strands had a configuration in which three thin lateral strands were disposed between mutually adjacent thick lateral strands, as shown in FIG. 4. The cross-sectional shape of the longitudinal strands was hexagonal with the thickness being greater than the width, and the thick strands (thick longitudinal strands and thick lateral strands) were composed of strands that were hexagonal in cross section with a thickness T of 5.4 mm and a width W of 4.2 mm. The thin strands (thin longitudinal strands and thin lateral strands) were composed of strands that were hexagonal in cross section with a thickness t of 3.6 mm and a width w of 3.4 mm. The lateral grid strands were configured so that three thin lateral strands were arranged between mutually adjacent thick lateral strands, as shown in FIG. 4, on the side near the plate lug section as well as the side set at a distance from the plate lug section. The values obtained by dividing the thickness T of the thick strands by the thickness t of the thin strands, i.e., the value obtained by dividing the thickness T of the thick longitudinal strands 24b by the thickness t of the thin longitudinal strands 24a and the value obtained by dividing the thickness T of the thick lateral strands 23b by the thickness t of the thin lateral strands 23a were 1.50. The values obtained by dividing the width W of the thick strands by the width w of the thin strands, i.e., the value obtained by dividing the width W of the thick longitudinal strands 24b by the width w of the thin longitudinal strands 24a and the value obtained by dividing the width W of the thick lateral strands 23b by the width w of the thin lateral strands 23a were 1.24.

Example 5

In the grid plate of example 5, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which two thin longitudinal strands 24a were disposed between mutually adjacent thick longitudinal strands 24b, 24b, as shown in FIG. 7, and the lateral grid strands had a configuration in which three thin lateral strands 23a were disposed between mutually adjacent thick lateral strands 23b, 23b, as shown in FIG. 4. The thick strands (thick longitudinal strands and thick lateral strands) were composed of strands that were hexagonal in cross section with a thickness T of 5.4 mm and a width W of 4.2 mm. The thin strands (thin longitudinal strands and thin lateral strands) were composed of strands that were hexagonal in cross section with a thickness t of 3.6 mm and a width w of 3.4 mm. The lateral grid strands were configured so that three thin lateral strands were arranged between mutually adjacent thick lateral strands, as shown in FIG. 4, on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 6

In the grid plate of example 6, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which three thin longitudinal strands were disposed between mutually adjacent thick longitudinal strands, and the lateral grid strands had a configuration in which three thin lateral strands were disposed between mutually adjacent thick lateral strands, as shown in FIG. 4. The thick strands (thick longitudinal strands and thick lateral strands) were composed of strands that were hexagonal in cross section with a thickness T of 5.4 mm and a width W of 4.2 mm. The thin strands (thin longitudinal strands and thin lateral strands) were composed of strands that were hexagonal in cross section with a thickness t of 3.6 mm and a width w of 3.4 mm. The lateral grid strands were configured so that three thin lateral strands were arranged between mutually adjacent thick lateral strands on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 7

Figure 6:
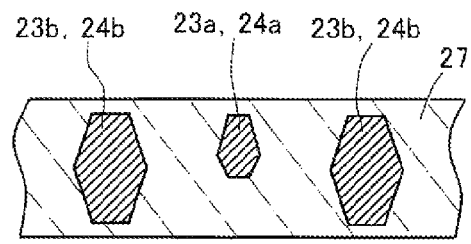
FIG. 6 is a cross-sectional view showing another modified example of the manner in which the grid plate strands are arranged in an embodiment of the present invention.

In the grid plate of example 7, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which a single thin longitudinal strand was disposed between mutually adjacent thick longitudinal strands, and the lateral grid strands had a configuration in which a single thin lateral strand was disposed between mutually adjacent thick lateral strands, as shown in FIG. 6. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The lateral grid strands were configured so that a single thin lateral strand was arranged between mutually adjacent thick lateral strands on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 8

In the grid plate of example 8, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which a single thin longitudinal strand was disposed between mutually adjacent thick longitudinal strands, and the lateral grid strands had a configuration in which two thin lateral strands were disposed between mutually adjacent thick lateral strands. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The lateral grid strands were configured so that two thin lateral strands were arranged between mutually adjacent thick lateral strands on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 9

In the grid plate of example 9, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which a single thin longitudinal strand was disposed between mutually adjacent thick longitudinal strands, and the lateral grid strands had a configuration in which three thin lateral strands were disposed between mutually adjacent thick lateral strands, as shown in FIG. 4. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The lateral grid strands were configured so that three thin lateral strands were arranged between mutually adjacent thick lateral strands on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 10

In the grid plate of example 10, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which a single thin longitudinal strand was disposed between mutually adjacent thick longitudinal strands, and the lateral grid strands had a configuration in which four thin lateral strands were disposed between mutually adjacent thick lateral strands, as shown in FIG. 3. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The lateral grid strands were configured so that four thin lateral strands were arranged between mutually adjacent thick lateral strands on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 11

Figure 8:
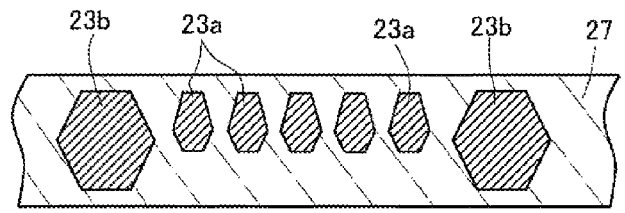
FIG. 8 is a cross-sectional view showing yet another modified example of the manner in which the grid plate strands are arranged in an embodiment of the present invention.
Figure 9:
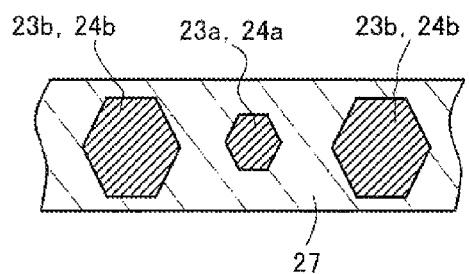
FIG. 9 is a cross-sectional view of a portion of a reference configuration example of a plate in which the grid plate of the present invention is used.

In the grid plate of example 11, thick strands (thick longitudinal strands and thick lateral strands) and thin strands (thin longitudinal strands and thin lateral strands) were provided to the longitudinal grid strands and lateral grid strands formed inside the frame section. The longitudinal grid strands had a configuration in which a single thin longitudinal strand was disposed between mutually adjacent thick longitudinal strands, and the lateral grid strands had a configuration in which five thin lateral strands were disposed between mutually adjacent thick lateral strands, as shown in FIG. 8. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The lateral grid strands were configured so that five thin lateral strands were arranged between mutually adjacent thick lateral strands on the side near the plate lug section as well as the side set at a distance from the plate lug section. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

The configuration of the grid plate of examples 4 to 11 are summarized in Table 1.

TABLE 1

| Item | Longitudinal grid strand No. of thin strands betw. thick strands | Lateral grid strand No. of thin strands betw. thick strands | Thick strand Thickness (mm) | Thick strand Width (mm) | Thin strand Thickness (mm) | Thin strand Width (mm) |
|---|---|---|---|---|---|---|
| Ex. 4 | 1 | 3 | 5.4 | 4.2 | 3.6 | 3.4 |
| Ex. 5 | 2 | 3 | 5.4 | 4.2 | 3.6 | 3.4 |
| Ex. 6 | 3 | 3 | 5.4 | 4.2 | 3.6 | 3.4 |
| Ex. 7 | 1 | 1 | 5.4 | 4.2 | 3.6 | 3.4 |
| Ex. 8 | 1 | 2 | 5.4 | 4.2 | 3.6 | 3.4 |
| Ex. 9 | 1 | 3 | 5.4 | 4.2 | 3.6 | 3.4 |
| Ex. 10 | 1 | 4 | 5.4 | 4.2 | 3.6 | 3.4 |
| Ex. 11 | 1 | 5 | 5.4 | 4.2 | 3.6 | 3.4 |

Example 12

In the grid plate of example 12, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which five thin lateral strands were disposed between mutually adjacent thick lateral strands, as shown in FIG. 8, in a first region set on the plate lug side, and a configuration in which a single thin lateral strand was arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 13

In the grid plate of example 13, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which five thin lateral strands were disposed between mutually adjacent thick lateral strands, as shown in FIG. 8, in a first region set on the plate lug side, and a configuration in which two thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 14

In the grid plate of example 14, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which five thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 15

In the grid plate of example 15, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which five thin lateral strands, as shown in FIG. 8, were disposed between mutually adjacent thick lateral strands in a first region set on the plate lug side, and a configuration in which four thin lateral strands, as shown in FIG. 3, were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 16

In the grid plate of example 16, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which a single thin lateral strand was arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 17

In the grid plate of example 17, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which two thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 18

In the grid plate of example 18, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 19

In the grid plate of example 19, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which three thin lateral strands were disposed between mutually adjacent thick lateral strands in a first region set on the plate lug side, and a configuration in which a single thin lateral strand was arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 20

In the grid plate of example 20, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which three thin lateral strands were disposed between mutually adjacent thick lateral strands in a first region set on the plate lug side, and a configuration in which two thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 21

In the grid plate of example 21, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which two thin lateral strands were disposed between mutually adjacent thick lateral strands in a first region set on the plate lug side, and a configuration in which a single thin lateral strand was arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 22

In the grid plate of example 22, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.8 mm and a width of 3.6 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.61; and the value obtained by dividing the width of the thick strands (thick longitudinal strands and thick lateral strands) by the width of the thin strands (thin longitudinal strands and thin lateral strands) was 1.06.

Example 23

In the grid plate of example 23, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 24

In the grid plate of example 24, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.0 mm and a width of 4.5 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.39; and the value obtained by dividing the width of the thick strands (thick longitudinal strands and thick lateral strands) by the width of the thin strands (thin longitudinal strands and thin lateral strands) was 1.32.

Example 25

In the grid plate of example 25, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 4.6 mm and a width of 4.9 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.28; and the value obtained by dividing the width of the thick strands (thick longitudinal strands and thick lateral strands) by the width of the thin strands (thin longitudinal strands and thin lateral strands) was 1.44.

Example 26

In the grid plate of example 26, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 4.2 mm and a width of 5.4 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.17; and the value obtained by dividing the width of the thick strands (thick longitudinal strands and thick lateral strands) by the width of the thin strands (thin longitudinal strands and thin lateral strands) was 1.59.

Example 27

In the grid plate of example 27, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 3.8 mm and a width of 6.0 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.06; and the value obtained by dividing the width of the thick strands (thick longitudinal strands and thick lateral strands) by the width of the thin strands (thin longitudinal strands and thin lateral strands) was 1.76.

Example 28

In the grid plate of example 28, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 5.2 mm and a width of 2.4 mm. The value obtained by dividing the thickness of the thick strands (thick longitudinal strands and thick lateral strands) by the thickness of the thin strands (thin longitudinal strands and thin lateral strands) was 1.04; and the value obtained by dividing the width of the thick strands (thick longitudinal strands and thick lateral strands) by the width of the thin strands (thin longitudinal strands and thin lateral strands) was 1.75.

Example 29

In the grid plate of example 29, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 5.0 mm and a width of 2.5 mm. The value obtained by dividing the thickness of the thick strands (thick longitudinal strands and thick lateral strands) by the thickness of the thin strands (thin longitudinal strands and thin lateral strands) was 1.08; and the value obtained by dividing the width of the thick strands (thick longitudinal strands and thick lateral strands) by the width of the thin strands (thin longitudinal strands and thin lateral strands) was 1.68.

Example 30

In the grid plate of example 30, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 4.4 mm and a width of 2.8 mm. The value obtained by dividing the thickness of the thick strands (thick longitudinal strands and thick lateral strands) by the thickness of the thin strands (thin longitudinal strands and thin lateral strands) was 1.23; and the value obtained by dividing the width of the thick strands (thick longitudinal strands and thick lateral strands) by the width of the thin strands (thin longitudinal strands and thin lateral strands) was 1.50.

Example 31

In the grid plate of example 31, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 4.0 mm and a width of 3.1 mm. The value obtained by dividing the thickness of the thick strands (thick longitudinal strands and thick lateral strands) by the thickness of the thin strands (thin longitudinal strands and thin lateral strands) was 1.35; and the value obtained by dividing the width of the thick strands (thick longitudinal strands and thick lateral strands) by the width of the thin strands (thin longitudinal strands and thin lateral strands) was 1.35.

Example 32

In the grid plate of example 32, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.6 mm and a width of 3.4 mm. The value obtained by dividing the thickness of the thick strands (thick longitudinal strands and thick lateral strands) by the thickness of the thin strands (thin longitudinal strands and thin lateral strands) was 1.50; and the value obtained by dividing the width of the thick strands (thick longitudinal strands and thick lateral strands) by the width of the thin strands (thin longitudinal strands and thin lateral strands) was 1.24.

Example 33

In the grid plate of example 33, thick strands and thin strands were provided to the longitudinal grid strands and lateral grid strands formed inside the frame section. The longitudinal grid strands had a configuration in which a single thin longitudinal strand was disposed between mutually adjacent thick longitudinal strands. The lateral grid strands had a configuration in which four thin lateral strands were disposed between mutually adjacent thick lateral strands in a first region set on the plate lug side, and a configuration in which three thin lateral strands were arranged between the mutually adjacent thick lateral strands in a second region on the leg side. The thick strands (thick longitudinal strands and thick lateral strands) were composed of strands that were hexagonal in cross section with a thickness of 5.4 mm and a width of 4.2 mm. The thin strands (thin longitudinal strands and thin lateral strands) were composed of strands that were hexagonal in cross section with a thickness of 3.2 mm and a width of 3.9 mm. The value obtained by dividing the thickness of the thick strands (thick longitudinal strands and thick lateral strands) by the thickness of the thin strands (thin longitudinal strands and thin lateral strands) was 1.69; and the value obtained by dividing the width of the thick strands (thick longitudinal strands and thick lateral strands) by the width of the thin strands (thin longitudinal strands and thin lateral strands) was 1.08.

The configurations of examples 12 to 33 are summarized in Table 2.

TABLE 2

| Item | Longitudinal grid strand No. of thin strands betw. thick strands | Lateral grid strand | | Thick strand | | Thin strand | |
|---|---|---|---|---|---|---|---|
| | | No. of thin strands betw. plate lug-side thick strands | No. of thin strands betw. leg-side thick strands | Thickness (mm) | Width (mm) | Thickness (mm) | Width (mm) |
| Ex. 12 | 1 | 5 | 1 | 5.4 | 4.2 | 3.6 | 3.4 |
| Ex. 13 | 1 | 5 | 2 | 5.4 | 4.2 | 3.6 | 3.4 |
| Ex. 14 | 1 | 5 | 3 | 5.4 | 4.2 | 3.6 | 3.4 |
| Ex. 15 | 1 | 5 | 4 | 5.4 | 4.2 | 3.6 | 3.4 |
| Ex. 16 | 1 | 4 | 1 | 5.4 | 4.2 | 3.6 | 3.4 |
| Ex. 17 | 1 | 4 | 2 | 5.4 | 4.2 | 3.6 | 3.4 |
| Ex. 18 | 1 | 4 | 3 | 5.4 | 4.2 | 3.6 | 3.4 |
| Ex. 19 | 1 | 3 | 1 | 5.4 | 4.2 | 3.6 | 3.4 |
| Ex. 20 | 1 | 3 | 2 | 5.4 | 4.2 | 3.6 | 3.4 |
| Ex. 21 | 1 | 2 | 1 | 5.4 | 4.2 | 3.6 | 3.4 |
| Ex. 22 | 1 | 4 | 3 | 5.8 | 3.6 | 3.6 | 3.4 |
| Ex. 23 | 1 | 4 | 3 | 5.4 | 4.2 | 3.6 | 3.4 |
| Ex. 24 | 1 | 4 | 3 | 5.0 | 4.5 | 3.6 | 3.4 |
| Ex. 25 | 1 | 4 | 3 | 4.6 | 4.9 | 3.6 | 3.4 |
| Ex. 26 | 1 | 4 | 3 | 4.2 | 5.4 | 3.6 | 3.4 |
| Ex. 27 | 1 | 4 | 3 | 3.8 | 6.0 | 3.6 | 3.4 |
| Ex. 28 | 1 | 4 | 3 | 5.4 | 4.2 | 5.2 | 2.4 |
| Ex. 29 | 1 | 4 | 3 | 5.4 | 4.2 | 5.0 | 2.5 |
| Ex. 30 | 1 | 4 | 3 | 5.4 | 4.2 | 4.4 | 2.8 |
| Ex. 31 | 1 | 4 | 3 | 5.4 | 4.2 | 4.0 | 3.1 |
| Ex. 32 | 1 | 4 | 3 | 5.4 | 4.2 | 3.6 | 3.4 |
| Ex. 33 | 1 | 4 | 3 | 5.4 | 4.2 | 3.2 | 3.9 |

[Confirmation of the Packed State of the Active Material]

An active material packing test for packing the positive active material paste was carried out using a paste packing machine under the same conditions for the grid plates of examples 5 to 33, and aging and drying was carried out thereafter to fabricate a positive plate that had not yet undergone formation.

The active material used in the experiment was fabricated using the conventional step described below. First, polyester fiber was admixed in the amount of 0.1 mass % with respect to the mass of the lead powder in which lead monoxide was the main component, water (12 mass %) and dilute sulfur acid (16 mass %) were subsequently added to reach 100 mass %, and the mixture was kneaded again to fabricate an active material paste for a positive plate.

[Packing Results]

Active material paste was packed into the grid plates of examples 5 to 33, and the packed state of the active material was observed in the reverse surface side of the grid plates which were facing downward during active-material packing. The assembly was then dried and aged, the manufactured plates were sectioned, and the packed state of the active material was observed. The results are shown in Table 3 below.

Figure 11:
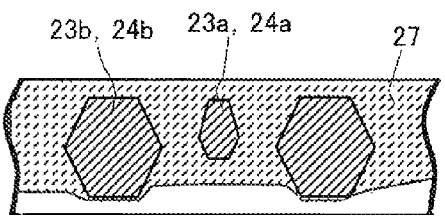
FIG. 11 is a cross-sectional view showing another example of the state in which active material has been packed into a plate in which the grid plate of an example of the present invention has been used.

As a result of visual confirming the packed state of the active material in the reverse surface side of the grid plates, it was confirmed that the thick strands and thin strands were embedded in the active material for each grid plate. However, as a result of sectioning and observing the plates, the thickness of the active material on the reverse side was low, as shown in FIG. 11, and there was tendency for the packing of the active material to be insufficient in the reverse surface side of the grid plates in examples 7, 8, 12, 13, 16, 17, 19 to 21, 26, 27, and 33.

Examples 7 and 8 were cases in which the number of thin lateral strands arranged between mutually adjacent thick lateral strands was a single strand or two strands; and examples 12, 13, 16, 17, and 19 to 21 were examples in which the number of thin lateral strands arranged between mutually adjacent thick lateral strands was a single strand or two strands in the second region in which the lateral strands are set at a distance from the plate lug. Examples 26 and 27 were examples in which the value obtained by dividing the width of the thick strands by the width of the thin strands was greater than 1.5; and the grid plate of example 33 was an example in which the value obtained by dividing the width of the thick strands by the width of the thin strands was less than 1.1.

TABLE 3

| Item | Result of packing | | Remarks |
|---|---|---|---|
| | Visual observation of packed state | Observation of cross-section | |
| Ex. 4 | No adverse issues | No adverse issues | — |
| Ex. 5 | No adverse issues | No adverse issues | Small number of thick strands |
| Ex. 6 | No adverse issues | No adverse issues | Small number of thick strands |
| Ex. 7 | No adverse issues | Active material on reverse side was thin | — |
| Ex. 8 | No adverse issues | Active material on reverse side was thin | — |
| Ex. 9 | No adverse issues | No adverse issues | — |
| Ex. 10 | No adverse issues | No adverse issues | Small number of thick strands |
| Ex. 11 | No adverse issues | No adverse issues | Small number of thick strands |
| Ex. 12 | No adverse issues | Active material on reverse side was thin | — |
| Ex. 13 | No adverse issues | Active material on reverse side was thin | — |
| Ex. 14 | No adverse issues | No adverse issues | Small number of thick strands |
| Ex. 15 | No adverse issues | No adverse issues | Small number of thick strands |
| Ex. 16 | No adverse issues | Active material on reverse side was thin | — |
| Ex. 17 | No adverse issues | Active material on reverse side was thin | — |
| Ex. 18 | No adverse issues | No adverse issues | — |
| Ex. 19 | No adverse issues | Active material on reverse side was thin | — |
| Ex. 20 | No adverse issues | Active material on reverse side was thin | — |
| Ex. 21 | No adverse issues | Active material on reverse side was thin | — |
| Ex. 22 | No adverse issues | No adverse issues | Strand had very long longitudinal length in cross-section |
| Ex. 23 | No adverse issues | No adverse issues | — |
| Ex. 24 | No adverse issues | No adverse issues | — |
| Ex. 25 | No adverse issues | No adverse issues | — |
| Ex. 26 | No adverse issues | Active material on reverse side was thin | — |
| Ex. 27 | No adverse issues | Active material on reverse side was thin | — |
| Ex. 28 | No adverse issues | No adverse issues | Strand had very long longitudinal length in cross-section |
| Ex. 29 | No adverse issues | No adverse issues | Strand had very long longitudinal length in cross-section |
| Ex. 30 | No adverse issues | No adverse issues | — |
| Ex. 31 | No adverse issues | No adverse issues | — |
| Ex. 32 | No adverse issues | No adverse issues | — |
| Ex. 33 | No adverse issues | Active material on reverse side was thin | — |

In examples 5, 6, 10, 11, 14, and 15, the number of thick strands was low, and in examples 22, 28, and 29 the cross-sectional shape of the strands was markedly oblong (long in the thickness direction of the plates and an excessively narrow width). A phenomenon was therefore observed in which the active material was poorly held and the active material readily fell away even at the level of vibration produced during conveyance and the like.

Furthermore, in examples 28 and 29, the gap was low for allowing the active material paste to flow, and there were locations observed to have insufficient packing of active material, even though there was no problem in terms of the observed cross sections.

Examples 5 and 6 were cases in which the number of thin longitudinal strands arranged between mutually adjacent thick longitudinal strands in the longitudinal grid strands was two or more (those cases in which the thick longitudinal strands and thin longitudinal strands were not arranged in alternating fashion). Example 11 was an example in which the number of thin lateral strands arranged between mutually adjacent thick lateral strands in the lateral grid strands was five or more. Examples 14 and 15 were examples in which the number of thin lateral strands arranged between mutually adjacent thick lateral strands was five in the first region set on the side near the plate lug. Example 22 was an example in which the numerical value obtained by dividing the thickness of the thick strands by the thickness of the thin strands was greater than 1.5, and examples 28 and 29 were examples in which the numerical value obtained by dividing the thickness of the thick strands by the thickness of the thin strands was less than 1.1.

In the case that the number of thin lateral strands arranged between mutually adjacent thick lateral strands is four in the first region set on the plate lug section side, and the number of thin lateral strands arranged between mutually adjacent thick lateral strands is four in the second region set on the side at a distance from the plate lug, as in example 10, it was confirmed that the electrical resistance of the grid increases as the distance from the plate lug section increases, and that the voltage drop in the grid strands increases as the distance from the plate lug section increases. In contrast, in the case that the number of thin lateral strands arranged between mutually adjacent thick lateral strands is four in the first region, and the number of thin lateral strands arranged between mutually adjacent thick lateral strands is three in the second region, as in examples 4, 9, 18, 23 to 25, and 30 to 32, it was confirmed that the voltage drop in the grid strands was suppressed in the second region.

Figure 10:
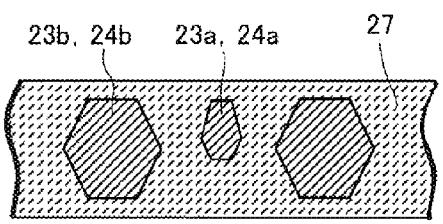
FIG. 10 is a cross-sectional view showing an example of the state in which active material has been packed into a plate in which the grid plate of an example of the present invention has been used.

From the results described above, it was confirmed the active material is neatly packed in the reverse side of the grid plate and grid strands are not exposed, as shown in FIG. 10, and it is possible to obtain a grid plate that can withstand corrosion over a long period and maintain the function of holding the active material in the grid plate, as in examples 4, 9, 18, 23 to 25, and 30 to 32, by using a configuration in which the longitudinal grid strands have thick longitudinal strands and thin longitudinal strands that are arranged in alternating fashion, and a configuration in which the lateral grid strands have four thin lateral strands arranged between mutually adjacent thick lateral strands in a first region set on the side near the plate lug section and three thin lateral strands arranged between mutually adjacent thick strands in the second region set on the side at a distance from the plate lug section; and by setting the dimensions of the thick strands and the thin strands so that the value obtained by dividing the thickness of the thick strands by the thickness of the thin strands and the value obtained by dividing the width of the thick strands by the width of the thin strands are accommodated in the range of 1.1 to 1.5.

In accordance with the present invention, it is possible to obtain a grid plate for a lead acid storage battery that can withstand corrosion over a long period of time and that can be readily packed with active material. Also, it is possible to obtain a valve regulated lead acid storage battery that has a longer service life than a conventional type by packing active material into the grid plate described above to constitute a positive plate.

The invention claimed is:

1. A grid plate for a lead acid storage battery comprising a frame section having a pair of lateral frame strands that extend in a lateral direction and oppose one another in a longitudinal direction, and a pair of longitudinal frame strands that extend in the longitudinal direction and oppose one another in the lateral direction; a plurality of lateral grid strands and a plurality of longitudinal grid strands that are provided so as to extend parallel to the lateral frame strands and the longitudinal frame strands, respectively, so that a grid is formed inside the frame section; and a plate lug section integrally formed in one lateral frame strand of the frame section, wherein at least one of: the longitudinal grid strands or the lateral grid strands, have a plurality of thin strands having a cross-sectional area that can withstand corrosion for a predetermined service life period of the lead acid storage battery, and a plurality of thick strands that have a greater cross-sectional area than that of the thin strands, the thick strands and thin strands being arranged so that the strands adjacent to the thick strands are thin strands;

the plurality of thick strands have a thickness that is less than the thickness of the frame section, end portions of the thick strands with respect to the thickness direction are positioned further inward in the thickness direction than end face portions of the frame section, respectively, in the thickness direction of the frame section; and the thick strands are arranged in a state in which the respective end portions of one end side in the thickness direction are positioned in the same plane;

the width and thickness of the thin strands are set to be less than the width and thickness of the thick strands; and the plurality of thin strands are provided in a state in which the respective end portions on one end side in the thickness direction, are positioned in positions closer to the plane in which the end portions of one end side of the plurality of thick strands in the thickness direction are arranged, as opposed to an opposing end side of the plurality of thick strands, but so as not to cross over the plane in which the end portions of one end side of the plurality of thick strands in the thickness direction are arranged.

2. The grid plate for a lead acid storage battery of claim 1, wherein the longitudinal grid strands have thick longitudinal strands that are the thick strands and thin longitudinal strands that are the thin strands; and the lateral grid strands have thick lateral strands that are the thick strands and thin lateral strands that are the thin strands.

3. The grid plate for a lead acid storage battery of claim 2, wherein the plurality of thin longitudinal strands and the plurality of thin lateral strands are provided in a state in which the respective end portions of one end side in the thickness direction, are positioned in the same plane as the plane in which the end portions of one end side of the thick longitudinal strands and the thick lateral strands in the thickness direction are arranged.

4. The grid plate for a lead acid storage battery of claim 2, wherein a ratio of the number of thin lateral strands to the number of thick lateral strands provided per fixed unit area in a region adjacent to one lateral frame strand provided with the plate lug section, is greater than a ratio of the number of thin lateral strands to the number of thick lateral strands provided per fixed unit area in a region near another lateral frame strand in a position set apart from the plate lug section.

5. The grid plate for a lead acid storage battery of claim 2, wherein
   the thick longitudinal strands and the thin longitudinal strands constituting the longitudinal grid strands are disposed so that the thick longitudinal strands and the thin longitudinal strands are aligned in alternating fashion in a lengthwise direction of the lateral frame strands;
   a first region and a second region are established, respectively, on one lateral frame strand side on which the plate lug section is disposed and on another lateral frame strand side in a position set apart from the plate lug section; and
   the number of thin lateral strands in the first and second regions is set so that the number of thin lateral strands arranged between the mutually adjacent thick lateral strands in the first region is greater than the number of thin lateral strands arranged between the mutually adjacent thick lateral strands in the second region, where the one of the lateral frame strands and the other of the lateral frame strands are regarded as thick lateral strands.

6. The grid plate for a lead acid storage battery of claim 5, wherein the number of thin lateral strands arranged between mutually adjacent thick lateral strands in the first region is 4, and the number of thin lateral strands arranged between mutually adjacent thick lateral strands in the second region is 3.

7. The grid plate for a lead acid storage battery of claim 2, wherein the value obtained by dividing the width of the thick longitudinal strands by the width of the thin longitudinal strands, the value obtained by dividing the thickness of the thick longitudinal strands by the thickness of the thin longitudinal strands, the value obtained by dividing the width of the thick lateral strands by the width of the thin lateral strands, and the value obtained by dividing the thickness of the thick lateral strands by the thickness of the thin lateral strands, are in a range of 1.1 to 1.5.

8. The grid plate for a lead acid storage battery of claim 1, wherein the lateral grid strands have thick lateral strands that are the thick strands, and thin lateral strands that are the thin strands, but the longitudinal grid strands have only thick longitudinal strands that are the thick strands.

9. The grid plate for a lead acid storage battery of claim 8, wherein the plurality of thin lateral strands are provided in a state in which the end portions of one end side thereof in the thickness direction, are positioned in the same plane as the plane in which the end portions of the one end side in the thickness direction of the thick longitudinal strands and the thick lateral strands are arranged.

10. The grid plate for a lead acid storage battery of claim 8, wherein a ratio of the number of thin lateral strands to the number of thick lateral strands provided per fixed unit area in a region adjacent to one lateral frame strand provided with the plate lug section, is greater than a ratio of the number of thin lateral strands to the number of thick lateral strands provided per fixed unit area in a region near another lateral frame strand in a position set apart from the plate lug section.

11. The grid plate for a lead acid storage battery of claim 8, in which:
   a first region and a second region are set near one lateral frame strand on which the plate lug section is disposed and near another lateral frame strand set apart from the plate lug section, respectively; and
   a ratio of the number of thin lateral strands to the number of thick lateral strands in said first region is set as a first ratio, and a ratio of the number of thin lateral strands to the number of thick lateral strands is set as a second ratio which is less than the first ratio.

12. A plate for a lead acid storage battery, wherein an active material is packed into the grid plate of claim 1.

13. A lead acid storage battery, wherein at least a positive plate has a configuration in which a positive active material is packed into the grid plate of claim 1.

* * * * *